United States Patent [19]
Hamid et al.

[11] Patent Number: 5,353,423
[45] Date of Patent: Oct. 4, 1994

[54] MEMORY CONTROLLER FOR USE WITH WRITE-BACK CACHE SYSTEM AND MULTIPLE BUS MASTERS COUPLED TO MULTIPLE BUSES

[75] Inventors: Mustafa A. Hamid, Irving; Gary W. Thome, Houston, both of Tex.

[73] Assignee: Compaq Computer Corporation, Houston, Tex.

[21] Appl. No.: 719,030

[22] Filed: Jun. 21, 1991

[51] Int. Cl.$^5$ .............................................. G06F 12/00
[52] U.S. Cl. ..................... 395/425; 364/238.4; 364/240.2; 364/243.4; 364/260.1; 364/DIG. 1; 395/400
[58] Field of Search ................................ 395/400, 425; 364/200 MS File, 900 MS File

[56] References Cited

U.S. PATENT DOCUMENTS

| | | | |
|---|---|---|---|
| 4,939,641 | 7/1990 | Schwartz et al. | 395/425 |
| 4,959,777 | 9/1990 | Holman, Jr. | 395/325 |
| 5,043,886 | 8/1991 | Witek et al. | 364/200 |
| 5,097,409 | 3/1992 | Schwartz et al. | 395/425 |
| 5,113,514 | 5/1992 | Albonesi et al. | 395/425 |
| 5,119,485 | 6/1992 | Ledbetter, Jr. et al. | 395/425 |
| 5,136,594 | 8/1992 | Sharp | 371/49.1 |
| 5,155,824 | 10/1992 | Edenfield et al. | 395/425 |
| 5,191,657 | 3/1993 | Ludwig et al. | 395/325 |
| 5,193,163 | 3/1993 | Sanders et al. | 395/425 |
| 5,195,089 | 3/1993 | Sindhu et al. | 370/85.1 |

Primary Examiner—Joseph L. Dixon
Assistant Examiner—Frank J. Asta
Attorney, Agent, or Firm—Pravel, Hewitt, Kimball & Krieger

[57] ABSTRACT

A computer system incorporating a memory controller which is capable of working with a write-back cache which operates using burst operations and with ISA and EISA bus masters. A state machine is provided for use with the cache controller and a state machine is provided for use with the EISA and ISA bus masters. When a bus master has requested data which is present only in the cache controller and a write-back operation must be performed, the memory controller halts the operation of the EISA and ISA bus masters until the data can be fully written back by the cache controller. In the case of an EISA bus master, this halting operation is performed by stretching the clocking signal which forms the synchronizing signal for the EISA bus. In the case of ISA bus masters, this halting is done by providing a wait state indication to the ISA bus masters. The state machine responsible for the memory controller cooperating with the bus masters is paused and the state machine for the cache controller is activated. The bus master state machine is paused until the cache controller state machine has completed all transfer operations and the data is fully contained in the main memory.

3 Claims, 29 Drawing Sheets

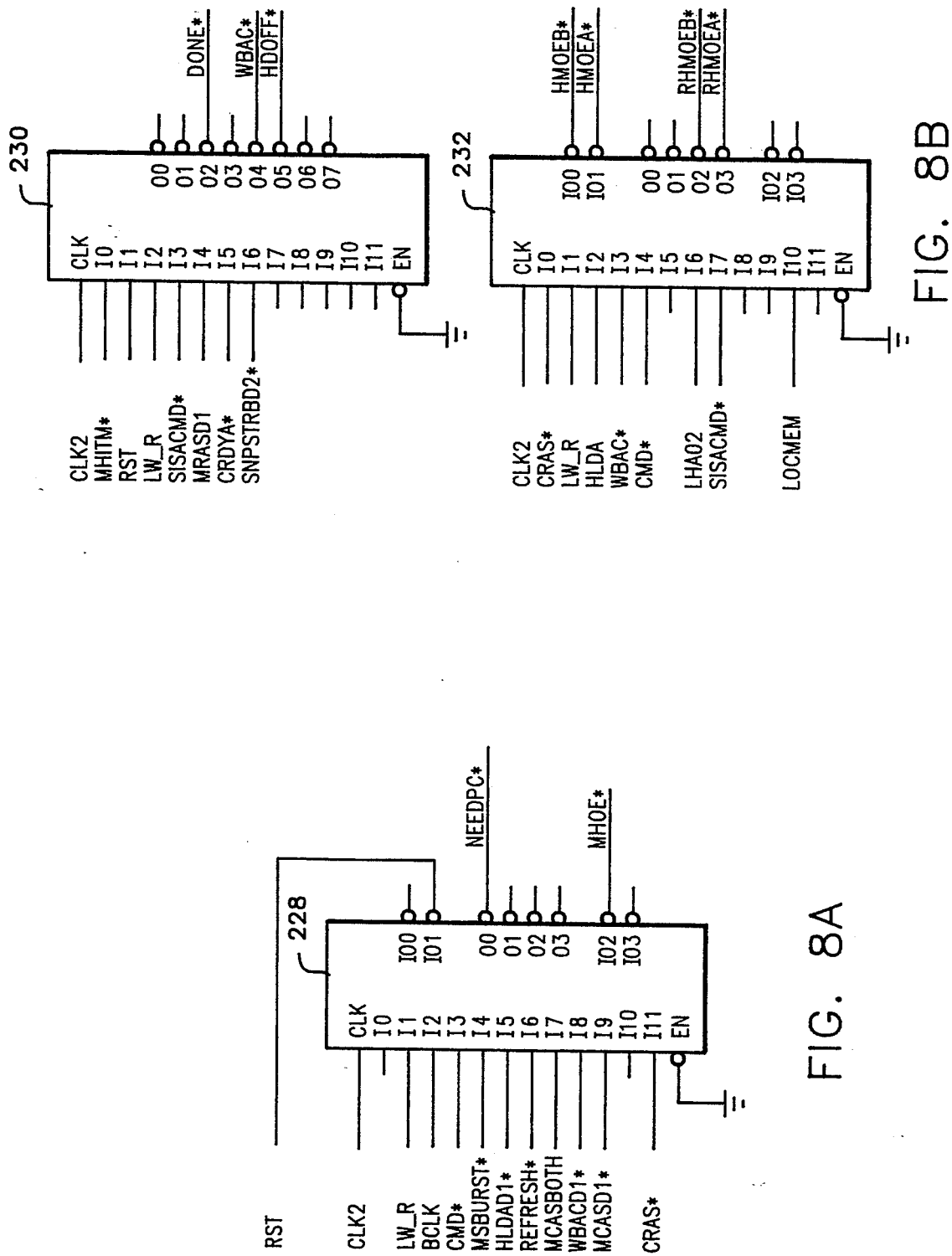

MEMORY CONTROLLER FOR USE WITH WRITE-BACK CACHE SYSTEM AND MULTIPLE BUS MASTERS COUPLED TO MULTIPLE BUSES

BACKGROUND OF THE INVENTION

1. Field of the Invention

The present invention relates to memory controllers for use in personal computers, and more particularly, to memory controllers for cooperation with write-back cache units and bus masters.

2. Description of the Related Art

Personal computers are becoming more powerful with each passing day. From their origins as simple 8 bit microprocessors with limited memory spaces, personal computers have advanced to very powerful 32 bit microprocessors with very large memory spaces. In the early days of personal computers memory speeds were sufficient to maintain pace with the microprocessor and the memory architectures were relatively simple. As microprocessors have advanced and the memory spaces have enlarged, the microprocessor speed has outpaced the affordable increase in speed of the memory devices used in the main memory. Additionally, because of the increased size and speed requirements, the memory architecture has become quite complicated. Paged mode dynamic random access memories (DRAMs) and interleaving are common these days to help allow the use of relatively affordable DRAM devices with the very fast microprocessors currently available. This use of page mode devices and interleaving has of itself greatly complicated the memory controller which forms the interface between the microprocessor and the memory devices.

While the use of page mode DRAMs and interleaving has to some extent helped alleviate the speed difference between the microprocessor and the memories, they have not been sufficient. To this end the use of cache systems is becoming prevalent. In a cache system a very small amount of very high speed static RAM (SRAM) is used. The SRAM is designed such that it can operate at the full speed of the microprocessor, thus allowing full speed operation when the data is contained in the cache. It is a function of a cache controller to determine which data is contained in the relatively small amount of high speed memory from the total memory contained in the system and to selectively keep portions of the main memory in the cache memory according to some replacement technique, such as least recently used (LRU). The cache controller hopefully allows a high percentage, called the hit rate, of cycles to be run in zero wait states directly from the cache. However, in instances it may be necessary to actually access the main memory to obtain the data necessary for the cycle or provide data to the main memory. In general there are two types of cache architectures. The first is a write through architecture, where all write operations are not only stored in the cache but also passed directly through to the main memory. This architecture has the advantage of being relatively simple but also has the disadvantage that it increases the amount of bus bandwidth utilized by the microprocessor. In multiprocessor systems or in systems utilizing bus mastering for use with peripheral devices, the use of such a high bandwidth dedicated to the microprocessor may be considered unacceptable.

One solution for the bandwidth problem is to use a second architecture for caches referred to as the write-back architecture. In this architecture, when data is written to the cache, it need not necessarily be written to the main memory. The data may be retained only in the cache. The cache controller then monitors or snoops the bus activity during the operations of other bus mastering devices. In this case if a read request is sensed to an address where the only valid copy of the data is contained in the write-back cache, the cache controller then halts the cycle and provides the data to the main memory and to the device requesting the data. This is referred to as a write-back cycle based on a snoop hit. Write-back caches can remain off the bus and reduce bandwidth requirements until actual hits are noted, at which time a write-back operation occurs. Therefore more bus bandwidth may be available for other bus masters, thus potentially increasing the speed and efficiency of the computer system.

However, write-back cache controllers have other problems in that they are more complex because they must monitor the bus activity at all times and additionally the computer system must be designed such that the cycle which produces the write-back requirement must be somehow interruptable so that the data can be returned to the memory and to the requesting device. This puts limitations on the overall computer system design not necessarily present with the write-through caches. Thus for the potential performance increase there are certain design trade offs which must be made.

Other techniques are also being developed which help reduce the bus bandwidth required during microprocessor operations. One of these techniques is called a burst operation. During a burst, several sequential items of data are transmitted at a very high speed in rapid sequence. This is conventionally done by presenting only a single starting address and then bursting the remaining data portions, the burst sequence proceeding according to a predetermined pattern. This allows the memory controller to determine proper memory locations. A primary advantage of burst mode operations is that full addresses need not be provided after the initial cycle because burst operations are generally defined so that they occur only within a single page as defined for page mode DRAMs. Because of the operational characteristics of page mode DRAMs when operated only in page mode, that is requiring only column addresses, the memories are significantly faster then if a full address is supplied. Therefore this advantage is used by burst mode operations to help speed up access and transfer times. This burst mode of operation is utilized quite commonly with cache controllers because cache controllers are commonly defined as having a line width which is a certain number of bits. If the line width is defined such that it is multiple segments of the main memory width, i.e. 64 bit line for a 32 bit memory, then it becomes possible to perform burst cycles if a line in the cache needs to be filled or, in the case of a write-back cache, needs to be written. This burst mode operation has further complicated the design of the memory controller.

As an additional means of gaining performance in personal computers, the use of bus masters located in external card slots is being developed. Typically, high performance personal computers utilize one bus connected between the memory and the processing unit and a second bus which cooperates with the external, interchangeable circuit boards. One example of this external bus is the EISA or Extended Industry Standard Architecture, a superset of the ISA or Industry Standard Architecture first developed by International Business Machines Corp. in the IBM PC/AT. The EISA specification defines various timings and parameters of boards which cooperate with this architecture and over the bus. Numerous functions can be developed for cards which plug into an external bus, such as modem cards, network interface cards, hard disk drive control cards and so on. With the use of local processing on some of these cards, such as hard disk drive interface cards and video processing cards, very high effective data rates can be achieved. The local processor can perform significant processing functions in parallel with the central processor of the computer system. This parallel operation thus greatly improves the system performance. One common technique for these local processors to provide or obtain data is through what is called bus mastering. When a particular card is in a bus mastering mode it has taken control of the external bus, preferably the EISA bus, and has gained access to the various other buses required to access the main memory. In this case the bus mastering card is in complete control of the external bus cycles and thus is considered the master. In these instances, the central microprocessor of the computer system does not have any access to the main memory. However, when cache memory is utilized, the central microprocessor may continue operations until a cache miss is developed.

A problem can develop when these bus mastering cards are utilized in cooperation with a write-back cache controller. As is noted above, in conventional designs using a write-back cache controller, a special state or cycle is defined which is called an inhibit state which inhibits operation of the data requesting unit to allow the cache controller to provide data to the memories and possibly to the requesting device. Conventionally, when the inhibit indication is provided, the driving or controlling unit ceases driving the bus to allow the cache controller access. This inhibit state is not defined for the ISA or EISA buses. Therefore, potential problems arise when a write-back cache controller is utilized in cooperation with an EISA or ISA bus master. Some technique must be developed for providing data to the bus master should it request data that is contained only in the write-back cache. This requirement even further complicates the design of the memory controller so that it must understand not only bus masters, write-back caches and burst mode, but all of those in simultaneous operation. Therefore it is desirable that a memory controller be designed which can handle all of these simultaneous functions to allow maximum computer system performance.

SUMMARY OF THE PRESENT INVENTION

A computer system incorporating the present invention includes a memory controller which is capable of working with a write-back cache which operates using burst operations and with ISA and EISA bus masters. In operation a state machine is provided for use with the cache controller and a separate state machine is provided for use with the EISA and ISA bus masters. Should the circumstance arise where a bus master has requested data which is present only in the cache controller and a write-back operation must be performed, the memory controller pauses the operations of the EISA and ISA bus masters in a non-idle condition until the data can be fully written back by the cache controller. In the case of an EISA bus master, this pausing operation is performed by stretching the clocking signal which forms the synchronizing signal for the EISA bus. In the case of ISA bus masters, this pausing is done by providing a wait state indication to the ISA bus masters so that the cycle appears to be quite long. During these operations the state machine responsible for the memory controller cooperating with the bus masters is looping in a non-idle state and the state machine for the cache controller is activated. The bus master state machine is paused until the cache controller state machine has completed all transfer operations and the data is fully contained in the main memory. At this point in time, after the main memory is coherent, the bus master state machine is released and proceeds through its normal cycle.

BRIEF DESCRIPTION OF THE DRAWINGS

A better understanding of the present invention can be had when the following detailed description of the preferred embodiment is considered in conjunction with the following drawings, in which:

FIGS. 6, 7A, 7B, 8A, 8B, 9A, 9B, and 10, and 11 are schematic illustrations of portions of the circuitry of the memory controller of the computer system of FIG. 1.

DETAILED DESCRIPTION OF THE PREFERRED EMBODIMENT

Figure 1:
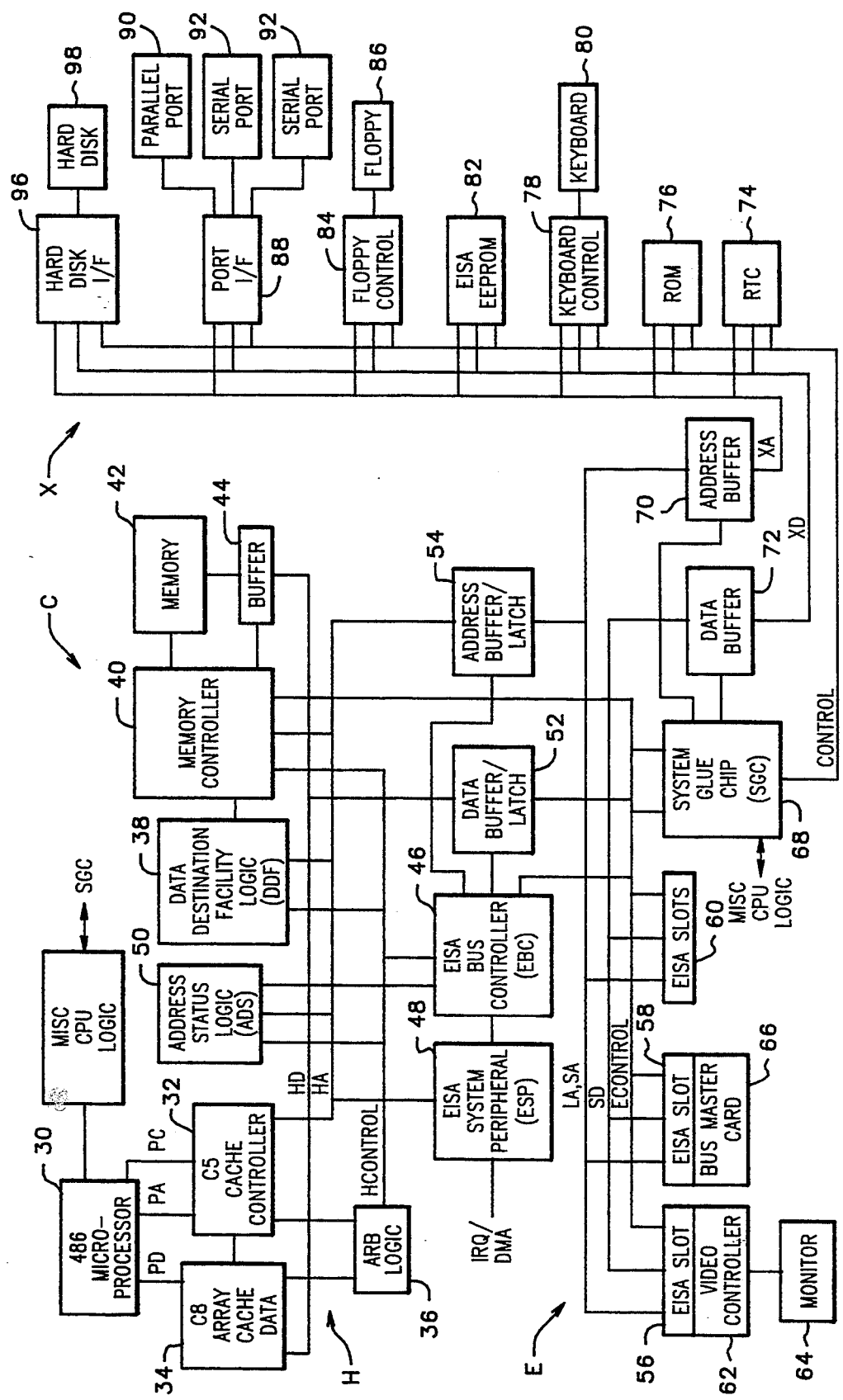
FIG. 1 is a block diagram of a computer system incorporating the present invention.

Referring now to FIG. 1, a computer system generally referred to by the letter C incorporating the present invention is shown. The foundation of a computer system C according to the present invention is a microprocessor 30, preferably the i486 from Intel Corporation (Intel). Connected to the microprocessor 30 is a cache subsystem comprising a cache controller 32, preferably the C5 or 82495 cache controller by Intel, and an array of cache data RAMs 34, preferably the C8 or 82490 data RAMs also from Intel. The microprocessor 30, the cache controller 32 and the cache data RAMs 34 are connected as indicated and specified by Intel. Preferably the components are the 50 MHz versions. To this end the processor data bus PD is connected to the data RAMs 34 and the processor address bus PA and the processor control bus signals PC are connected to the cache controller 32. The cache controller 32 and the cache data RAMs 34 are also connected by various control signals.

The cache controller 32 and the cache data RAMs 34 are coupled to a bus generally referred to as the host bus H which includes a host data bus HD portion, a host address bus HA portion and a host control bus HCONTROL portion. Arbitration logic 36 produces some control signals in the HCONTROL bus from signals provided by the cache controller 32 and the cache data RAMs 34. The HCONTROL bus includes signals such as the memory read or write signal, the memory or input/output signal, various address and data strobes and so on as commonly utilized by the various other elements in the computer system C. Certain of these signals will be explained in more detail.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application Ser. No. 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAMs) arranged in an interleaved format. The memory controller 40 includes the necessary functions to control the operation of the DRAMs and of the data buffer 44. The operation of the memory controller 40 will be explained in greater detail below.

In the preferred embodiment, the computer system C utilizes the EISA or Extended Industry Standard Architecture for the external bus. The EISA bus is generally referred to by the letter E in the Figure. For further details on the EISA bus and architecture, please refer to the EISA Technical Reference Guide published by Compaq Computer Corporation. The EISA bus E is comprised of several portions, the LA and SA address buses, the SD data bus and the ECONTROL control bus. A bus controller 46 referred to as the EBC, preferably one compatible with the 82358 from Intel, provides certain of the necessary control functions between the host bus H and the EISA bus E. Connected to the EBC 46 is the EISA system peripheral (ESP) 48, preferably one such as the 82357 from Intel, which includes various timers, the direct memory access (DMA) controller and the interrupt controller logic of the computer system C. Also connected to the EBC 46 is ADS or address strobe logic 50. The ADS logic 50 is used to convert certain differences in the various strobes from the cache controller 32 to those necessary for use by the EBC 46. The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. This operation is controlled in part by the bus mastering card 66, in part by the EBC 46 and in part by the memory controller 40. Operation of this action will be explained in more detail below. It is noted that the bus master card 66 could be either an EISA bus master or an ISA bus master. It is also noted that the EBC 46 is considered an EISA bus master during DMA cycles as it is controlling both buses. All references to an EISA bus master include this DMA and EBC 46 case. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations; an address buffer 70 and a data buffer 72. The SGC 68 controls the operation of the data buffer 72 and the address buffer 70, as well as providing various strobes over an X control bus to the miscellaneous devices contained on the X bus. The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device (not shown). An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96. This list of peripheral devices is exemplary and numerous other peripheral devices could be developed either on the X bus or on the EISA bus E.

This description of the preferred embodiment of the computer system C is exemplary only and other variations in the computer system design could of course be developed.

Figure 2:
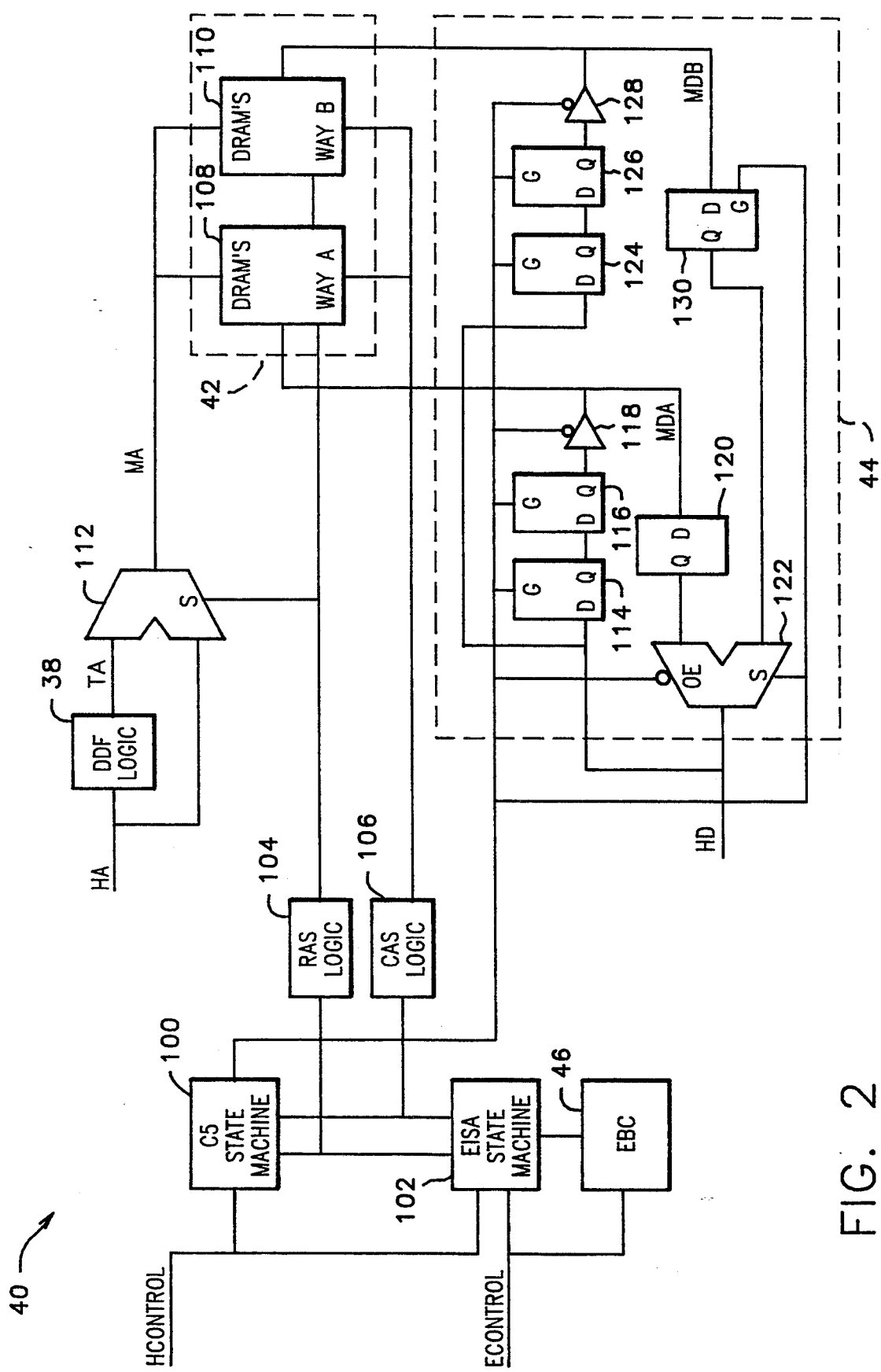
FIG. 2 is a block diagram of the memory portion of the computer system of FIG. 1.

The memory subsystem is shown in more detail in FIG. 2. The basis of the memory controller 40 is a C5 state machine 100 and an EISA state machine 102. These state machines provide the controlling functions and sequencing logic for the memory controller 40 when, respectively, the C5 cache controller 32 is in control of the host bus H or the EBC 46 is controlling the host bus H to allow EISA devices to access the memory 42 or DMA or refresh operations are occurring. The C5 state machine 100 and the EISA state machine 102 are connected to each other to allow communication between the state machines. Additionally, both state machines 100 and 102 are connected to the HCONTROL bus to receive and provide control information. The EISA state machine 102 is connected to the EBC 46 and to the E control portion of the EISA bus E. Additionally, both state machines 100 and 102 are connected to row address strobe or RAS logic 104 and column address strobe or CAS logic 106. The RAS logic 104 and CAS logic 106 provide the RAS and CAS strobes to the various memory devices.

As shown in FIG. 2, the memory 42 is partitioned as an interleaved memory having two banks. The first bank 108 is considered to be way A or bank A, while the second bank is considered to be way or bank B. Preferably both banks are 32 bits wide and further incorporate parity information. By the use of interleaving the effective speed of operation of the memory system can be increased. The address signals to the memory 42 are provided by the output of a multiplexor 112. At one input the multiplexor 112 receives the TA address signals from the DDF logic 38, while the other input receives the host address signals HA. Selection of the particular input of the multiplexor 112 is provided by an output of the RAS logic 104. In this way the row and column addresses can be readily provided to the memory 42.

Additionally in FIG. 2, the buffer 44 is shown in more detail. In the preferred embodiment, the data path from the host bus H to the memory 42 includes a pair of latches for each particular leave or bank while the data path from the memory 42 to the host bus H is through a single latch. For example, the host data bus HD is connected to the D inputs of a series of latches 114. The outputs of the latches 114 are connected to the D inputs of a second series of latches 116. The output of the latches 116 are connected to the inputs to tri-state buffers 118. The outputs of the tri-state buffers 118 are connected to the memory data bank A or MDA bus. Preferably the latches 114 and 124 are fast latches having short setup and hold times because of the speeds of operation in the preferred embodiment and the propagation delays involved. The enable signals for the latches 114 and 116 and the tri-state control for the buffers 118 are provided by the C5 state machine 100 as will be explained. Also connected to the MDA bus is a latch 120 whose D inputs are connected to the MDA bus and whose outputs are connected to one input of a data multiplexor 122. The output of the data multiplexor 122 is connected to the host data bus HD. The way selection and output enable capabilities of the multiplexor 122 are provided by outputs from the C5 state machine 100 and their operation will be detailed below.

Similarly, a set of latches 124 has its D inputs connected to the HD bus and its outputs connected to the D inputs of a second set of latches 126. The output of the latches 126 are connected to the inputs of tri-state buffers 128 whose outputs form the memory data bank B or MDB bus. The enable controls for the latches 126 and the tri-state control for the buffers 128 are provided by the EISA state machine 100. A latch 130 has its D inputs connected to the MDB bus and its outputs connected to the second input of the data multiplexor 122. Thus by properly selecting the input of the multiplexor 122 the data outputs of bank A or bank B can be provided to the host data bus HD.

Figure 3A:
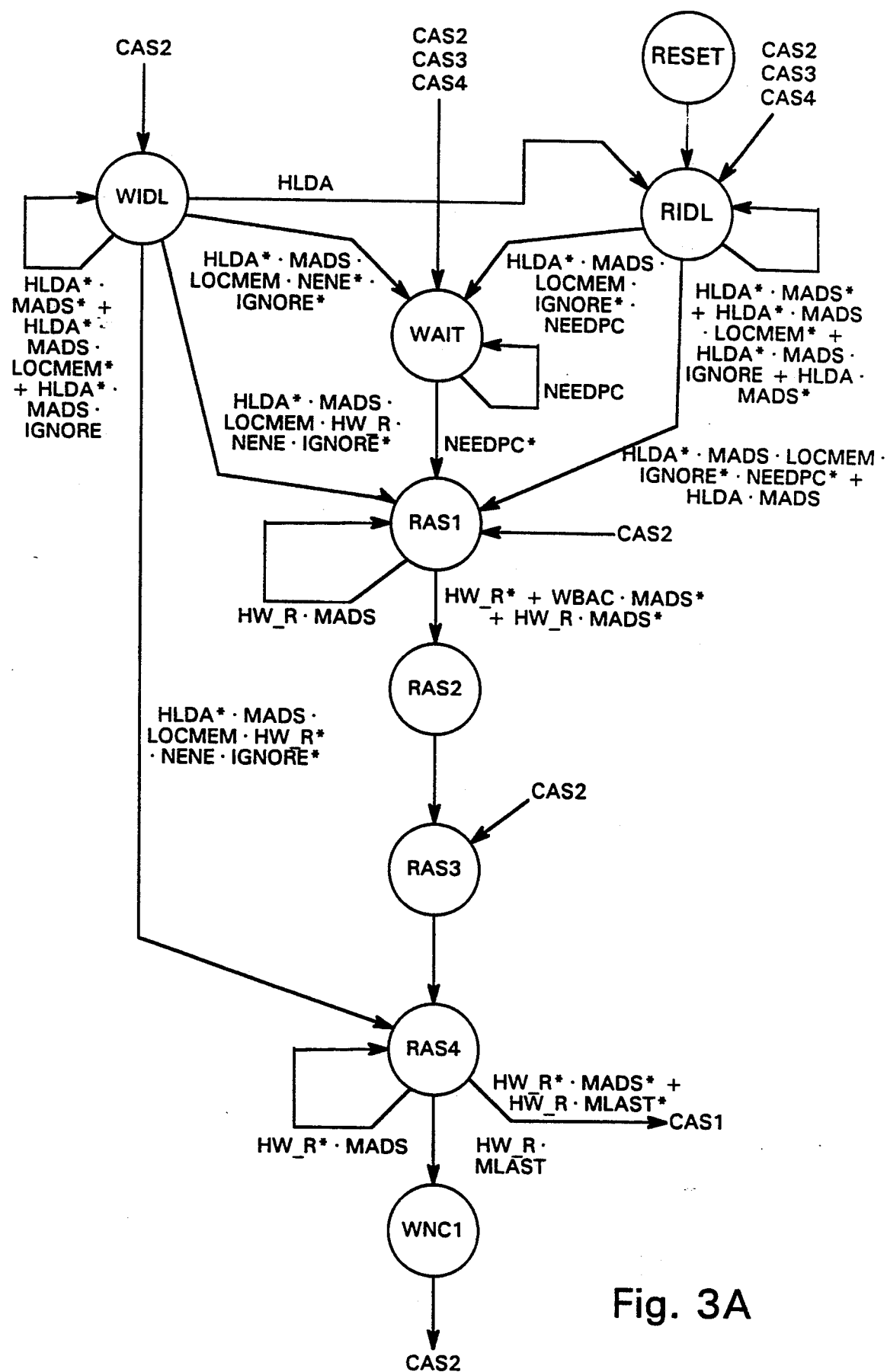
FIGS. 3A, 3B, 4, 5A and 5B are state machine drawings portions of the operation of portions of the memory controller of FIG. 1.
Figure 3B:
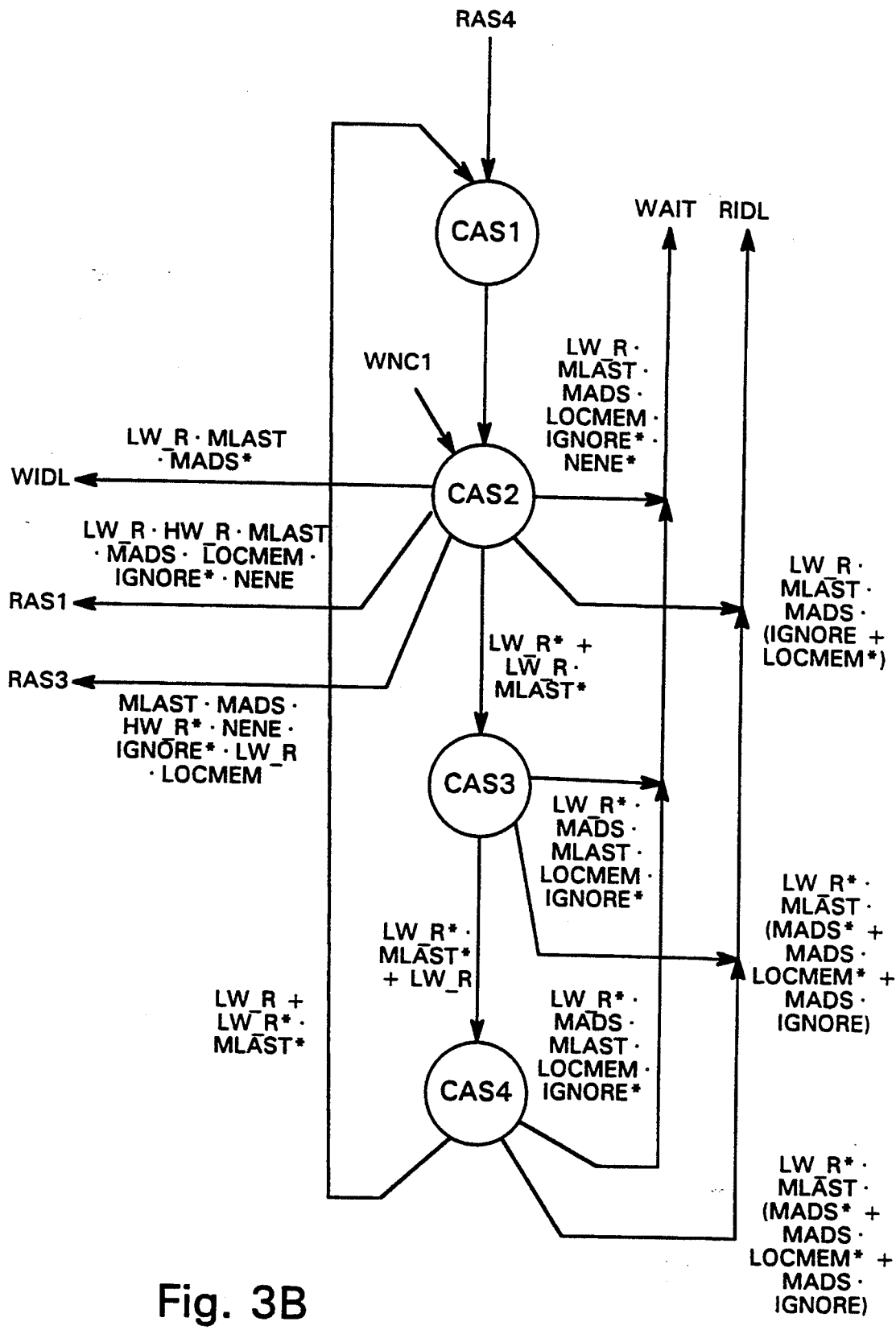

The basic sequencing of the C5 state machine 100 is shown in FIGS. 3A and 3B. The state machine diagram indicates the basic flow of operation of the C5 state machine 100, with the various outputs that are to be developed based on various states of the state machine 100 to be explained in detail in the discussion of the specific schematics used to develop the state machines 100 and 102. Operation of the C5 state machine 100 commences at the RESET state upon reset of the computer system C. In the preferred embodiment the state machine is advanced by the 50 MHz clock utilized to clock the microprocessor 30, the cache controller 32 and the cache data RAMs 34. This clocking signal is generally referred to as the CLK2 signal. From the reset state control proceeds to the read idle or RIDL state. The C5 state machine 100 contemplates and operates with four basic types of cycles, single dword or 32 bit read and write cycles and burst read and write cycles. In the preferred embodiment a burst cycle from the cache controller 32 consists of four dword operations. Additionally, any of these cycles can be pipelined. Further, each of these cycles may be run as page hit, page miss or initial cycles. Page hit cycles are cycles wherein the memory devices are already at the proper memory page and only column addresses need to be provided. In page miss cycles the full addresses must be provided to the memory devices. Initial cycles are provided after certain idle states. Table A indicating the various cycles which can be performed is shown at the end of the description, with the particular state sequencing shown for each particular cycle type. The actual transitions from state to state will be explained in more detail.

The C5 state machine 100 stays in the RIDL state for numerous conditions. The first condition is indicated by the HLDA or cache controller hold acknowledge signal being low, which indicates that the cache controller 32 is in control of the operation or is the master of the host bus H, and the MADS* or signal is high, indicating that address information is not available and a cycle is not beginning. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields. Additionally, a signal mnemonic having an asterisk is the inverse of the signal mnemonic without an asterisk.

A second condition is that the cache controller 32 is the owner of the bus, an MADS strobe is present indicating an active cycle, but the request is not going to the memory contained in the memory 42 but is instead going to other memory, generally on the EISA bus. This is indicated by the LOCMEM* or local memory signal being unasserted or high. The LOCMEM signal is provided by the DDF 38. A third condition is where the C5 cache controller 32 is the owner of the bus and an MADS strobe is present, but an IGNORE signal is being received. The IGNORE signal indicates that an input/output or DDF programming cycle is in progress. The final condition for remaining in the RIDL state is if the cache controller 32 is not the owner of the host bus H, as indicated by the HLDA signal being high, and an MADS strobe is not present.

Control transfers from the RIDL state to a WAIT state if the cache controller 32 is controlling the host bus H, an MADS strobe is present, the reference is to the local memory, the cycle is not to be ignored and pre-charge is needed for the memories 42. This pre-charge condition is indicated by the signal NEEDPC being high. This signal is developed by a subsidiary state machine shown in FIG. 4. As is well known, DRAMs require certain pre-charge times before a row address strobe can be provided. This is frequently provided in the state machine during the RIDL state during idle states but under certain conditions, such as transfers from a page hit to a page miss condition with no intervening idle states it may be necessary to wait for the pre-charge to complete before the cycle can start. Another condition for needing pre-charge is if the RIDL state had been entered for only a short period of time and again a page miss condition was developed. The operation of this auxiliary state machine will be described below. Control of the C5 state machine 100 stays at the WAIT state until the NEEDPC signal goes low, indicating that the pre-charge time has been completed. Control then proceeds to the RAS1 state. This is also the state where control would proceed from the RIDL state under two conditions. The first condition is if the cache controller 32 is in charge of the host bus, an MADS strobe is present, the access is to the local memory, the cycle is not to be ignored, and pre-charge is not needed. The second condition is if the cache controller 32 is not in control and an address strobe is present as indicated by the MADS signal.

Control stays at the RAS1 state during write operations while the MADS* strobe is low. Control proceeds from the RAS1 state to the RAS2 state if a read operation is in progress; a write-back operation is commencing as indicated by the WBAC signal being high and the MADS* signal being high, indicating that an address strobe is not present; or in a write cycle when the MADS strobe is removed. Control proceeds from the RAS2 state to the RAS3 state in all cases after one CLK2 signal rising edge. Similarly, control proceeds from the RAS3 state to the RAS4 state on the next rising edge of the CLK2 signal.

There are three potential exits from the RAS4 state. The first is a loop back to the RAS4 state and this occurs if a read cycle is occurring and a memory address status strobe is present. Control transfers to a state referred to as the CAS1 state if a read cycle is occurring and the MADS strobe is not present or if a write cycle is occurring and this not the last transfer in a burst operation, as indicated by the MLAST* signal being high. The third exit from the RAS4 state occurs if a write cycle is occurring and this is the last operation of a burst, in which case control proceeds to the WNC1 state. Control proceeds from the WNC1 state to the CAS2 state.

Control always proceeds from the CAS1 state to the CAS2 state. There are numerous exits from the CAS2 state. The first exit occurs if a write cycle is in progress, this was the last operation in a burst and an MADS strobe is not present. In this case, control proceeds to a state referred to as the WIDL or write idle state. This transfer is done at the end of a burst write cycle when pipelining is not in effect. Control remains at the WIDL state if the cache controller 32 is in control of the host bus H and an MADS strobe is not present, if the cache controller 32 is in control of the host bus H and an MADS strobe is present but the address is not to local memory or finally, if the cache controller 32 is in control of the host bus and an MADS strobe is present but this cycle is to be ignored as indicated by the IGNORE signal. If the HLDA signal is asserted during the WIDL state, indicating that the cache controller 32 is no longer in control of the host bus H, control proceeds from the WIDL state to the RIDL state so that an initial cycle can be run on the next cycle. If the next cycle is being performed by the cache controller 32, the MADS strobe is present, the memory being accessed is local, the cycle is not to be ignored and the next address is not a near address, as indicated by the NENE* or next near signal provided by the cache controller 32, then control proceeds to the WAIT state to allow for pre-charging of the memory 42. If the cache controller 32 is in control of the host bus H, an MADS strobe is present, the access is to local memory, it is a write access, the next address is near, and it is not to be ignored, control proceeds to the RAS1 state. The final exit from the WIDL state occurs if the cache controller 32 is in control, an MADS strobe is present; the access is to local memory; it is a read operation; the address is near, that is it is within a 2 kbyte page; and it is not to be ignored, control proceeds to the RAS4 state.

Returning now to CAS2 state, control proceeds from the CAS2 state to the RAS1 state if the current cycle is a write operation, as indicated by the LW_R signal being high; the next cycle is also a write cycle as indicated by the HW_R signal being high; the current cycle is the last cycle of a burst; an MADS strobe is present; the next cycle is to local memory; is not to be ignored and is near. This will occur in the transition from a first to a second burst operation in the computer system C of the preferred embodiment. The LW_R signal is a latched version of the HW_R to allow tracking past the valid portion of the HW_R signal. Control transfers from the CAS2 state to the RAS3 state if a write operation is currently in operation; the next operation is to be a read operation as indicated by the HW_R* signal being high; the current operation is the last operation in a burst; an MADS strobe is present for the next cycle; the next cycle is a near address, i.e. a page hit; the cycle is not to be ignored and it is to local memory. This a write to pipelined read transition.

Control returns from the CAS2 state to the WAIT state if the current operation is a write cycle, it is the last operation of a burst, an MADS strobe is present for the next cycle, the cycle is going to be to local memory, it is not to be ignored and it is not a near address, so that a page miss develops. The return to the WAIT cycle allows the necessary pre-charge to be developed. Operation proceeds from the CAS2 state to the RIDL state if a write operation has been occurring, this was the last operation in a burst, an MADS strobe is present and the cycle is either to be ignored or is not to local memory, so that operation can be started from an initial state. Finally, control proceeds from the CAS2 state to the CAS3 state if a read cycle is occurring or this is not the last operation in a burst write cycle.

Control proceeds from the CAS3 state to the WAIT state if the current cycle is a read operation, an MADS strobe is present for the next cycle, this is the final cycle in a burst operation, the next cycle is to local memory and is not to be ignored. Control proceeds from the CAS3 state to the RIDL state if a read operation is occurring that is the last operation of a burst and either an MADS strobe is not present or an MADS strobe is present and the operation is not to local memory or is to be ignored. Control proceeds from the CAS3 state to the CAS4 state if a write operation is present or this is the last operation of a burst read.

Control returns from the CAS4 state to the CAS1 state if a write operation is occurring or if this is not the last operation of a burst read. This loop from CAS1 through CAS4 and returning back to CAS1 is the page mode hit cycle and is done during burst operations as provided by the cache controller 32. Control proceeds from the CAS4 state to the WAIT state if the current operation was a read, an MADS strobe for the next operation is present, this was the last operation in a burst, the next operation is to local memory and is not to be ignored. Control proceeds from the CAS4 state to the RIDL state for final burst read operations if the MADS strobe is not present or if an MADS strobe is present and the access is not to local memory or is to be ignored.

This has been the state by state sequencing of the C5 state machine 100. It is understood that in various states certain logic signals are developed to provide control signals to the buffer 44 and to the memory 42. The development of those signals will be explained below. Further, in the timing diagrams of FIGS. 12–22 the particular states of interest in the C5 state machine 100 are indicated to allow correlation between the actual waveforms and the particular state of the C5 state machine 100.

Figure 4:
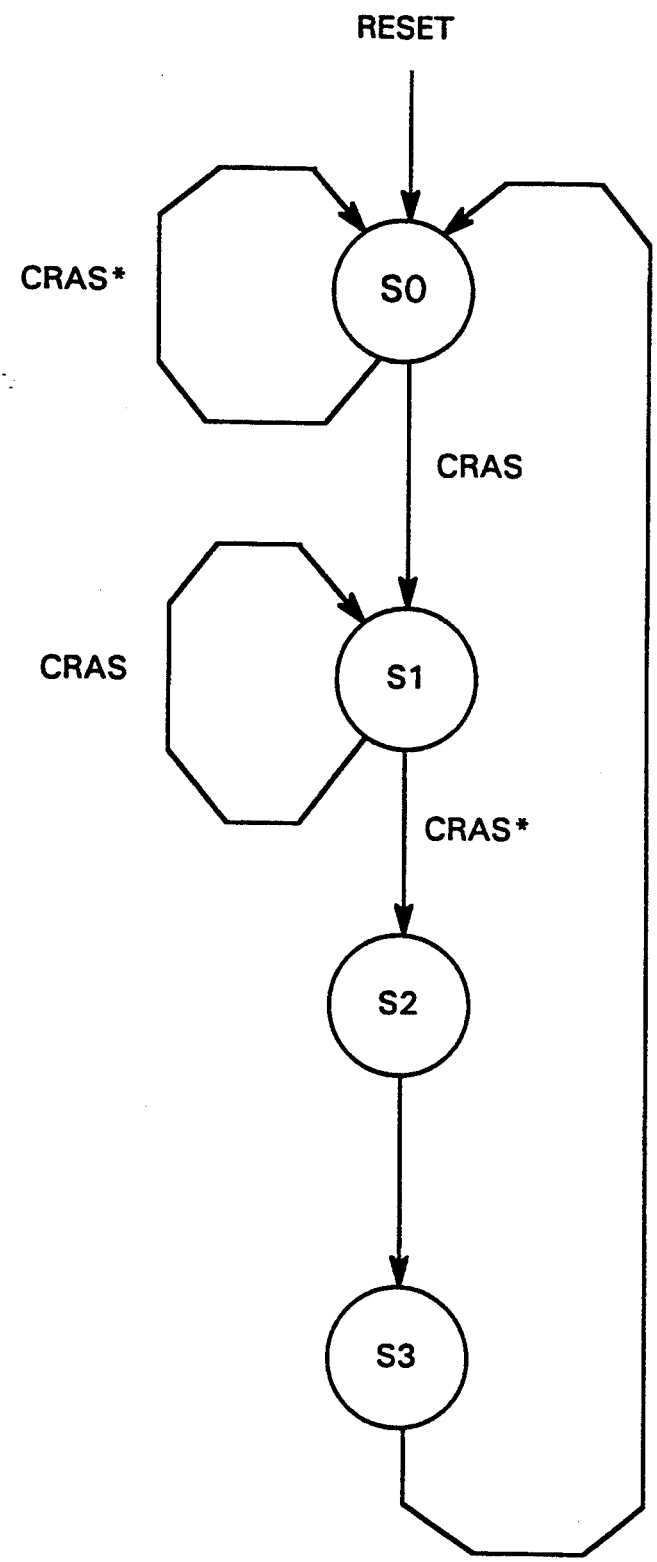

Referring now to FIG. 4, the pre-charge control state machine is shown. On reset control proceeds to state S0. If a signal referred to as CRAS or the bank A master RAS strobe from the C5 state machine 100 is inactive, that is the CRAS* signal is high, control stays in state S0. If a RAS strobe is provided to the memory 42 from the state machine 100, control proceeds from state S0 to state S1. It is noted that the state machine is also clocked on the CLK2 signal. Control remains in state S1 while the RAS strobe is active. In the preferred embodiment this is basically during the RAS, CAS and WIDL states. When the RAS strobe is removed, control proceeds from state S1 to S2. Control then proceeds sequentially from states S2 to state S3 to state S0.

The NEEDPC signal is asserted in states S1, S2 and S3. Thus the NEEDPC signal is asserted at the beginning of a full memory cycle when the RAS signal goes low and is held low for at least two full cycles after the RAS signal is raised.

Figure 5A:
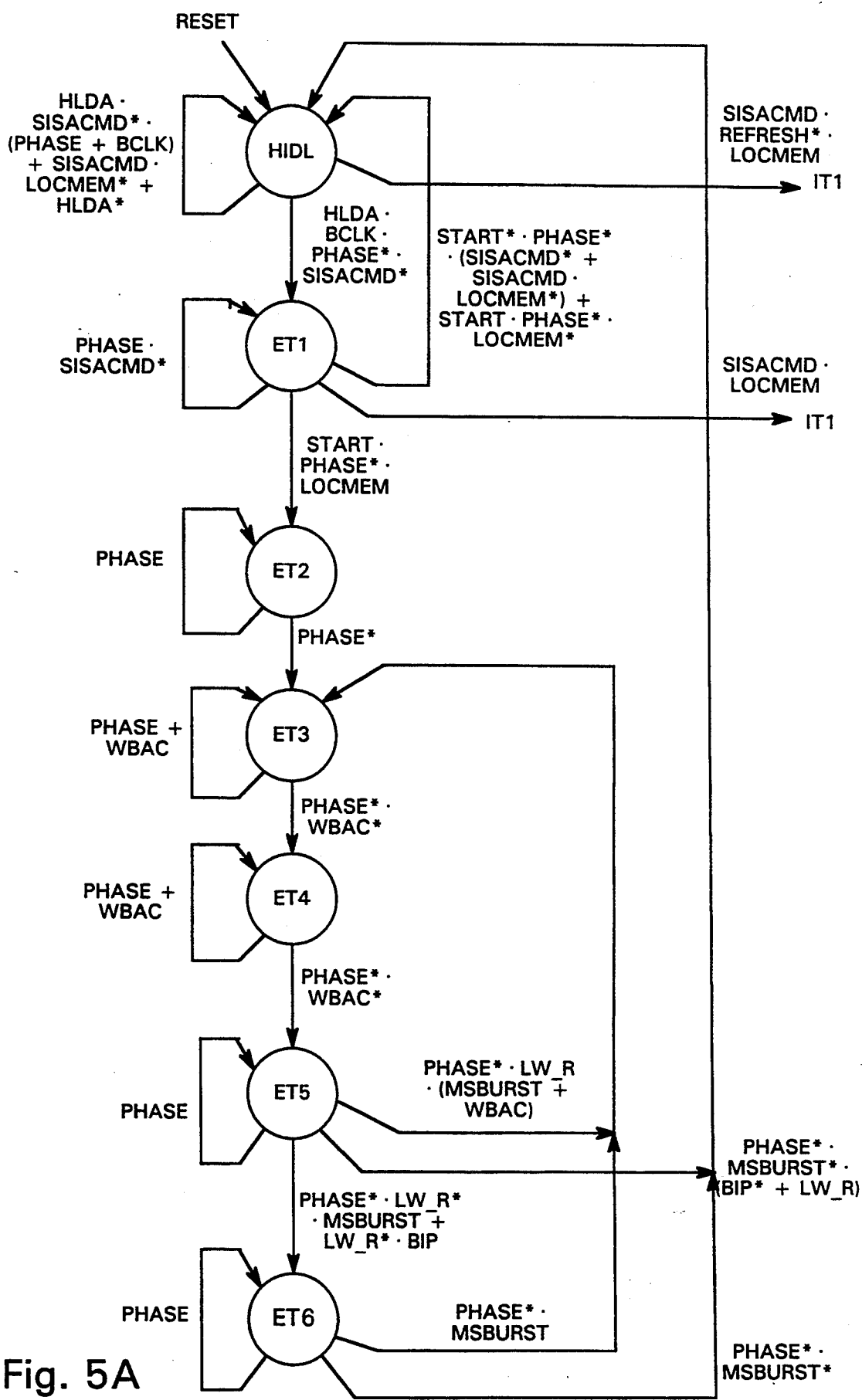
Figure 5B:
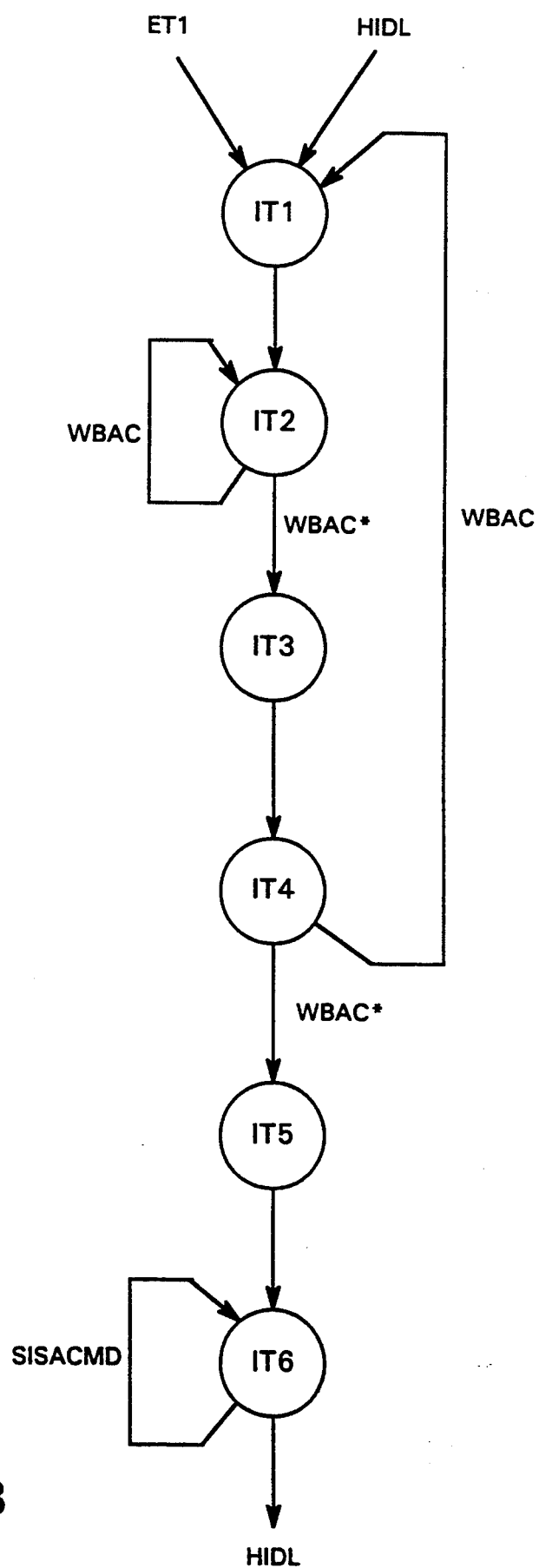
Figure 6:
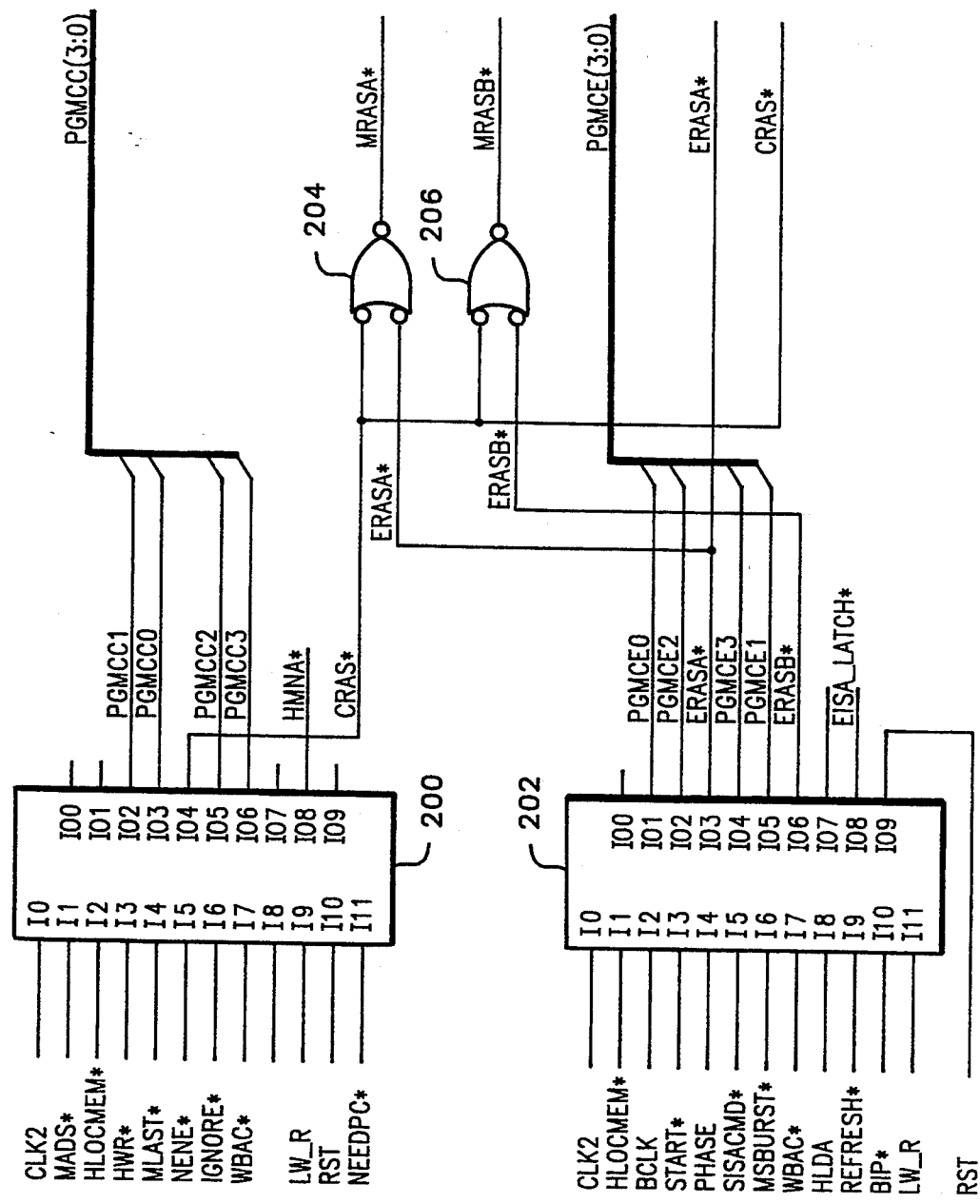

FIGS. 5A and 5B show the operation of the EISA state machine 102. Upon reset, control proceeds to the HIDL or host idle state. This particular state machine, while being clocked by the CLK2 signal, during certain portions must be synchronized with the EBC 46. For this purpose a separate signal which is a 25 MHz signal which is in phase with or is the clock signal being provided to the EBC 46 is used to advance through portions of the state machine. This synchronizing clock is referred to as the PHASE signal. The EISA state machine 102 runs three types of cycles. The first is a conventional EISA read or write cycle, the second cycle type is the EISA burst read and write cycle, and the final type is an ISA cycle being run by an ISA bus master. The state cycle table is generally shown as Table B at the end of this description.

Returning now to the sequencing of the EISA state machine 102, control remains in the HIDL state while the host bus H is on hold from the cache controller 32, an ISA bus master is not in control and either the PHASE signal is true or the BCLK signal is true. The PHASE signal as mentioned above is a 25 MHz or half CLK2 signal which is in phase with the clock being supplied to the EBC 46 so that this portion of the state machine will run in synchronization with the EBC 46. The BCLK signal is the basic clocking signal on the EISA bus E. The second condition where the control remains at the HIDL state is if an ISA bus master is control, as indicated by the SISACMD signal being high, and the operation is not to the local memory 42. A final condition where control remains in the HIDL state is if the cache controller 32 is in control of the host bus H as indicated by the HLDA signal being low.

If an ISA bus master is in control of the computer system C, as indicated by the SISACMD signal being high, a refresh cycle is not occurring and the operation is to local memory, control proceeds to a state referred to as IT1. This state will be explained below. If the EBC 46 is in control of the host bus H, as indicated by the HLDA signal being high; the BCLK signal is true, the PHASE signal is low and an ISA bus master is not in control of the computer system C, control proceeds from the HIDL state to the ET1 state. Control remains in the ET1 state while an ISA bus master is not in control and the PHASE signal is true. Control returns from ET1 state to the HIDL state if the START signal is true, indicating the beginning of a EISA cycle; the PHASE signal is low and either an ISA bus master is not in control or an ISA bus master is in control and the access is not to local memory. A second condition for returning control from ET1 state to the HIDL state is if the START signal is present, the cycle is not in phase and it is not to local memory.

If in the ET1 state it is determined on the next transition of the CLK2 signal that an ISA bus master is in control of the system and a local memory cycle is being developed, control proceeds to state IT1. If an EISA cycle is proceeding, as indicated by the START signal being low; the clocks are of sufficiently proper phase and the access is to local memory, control proceeds from the ET1 state to the ET2 state. Control proceeds from the ET2 state to the ET3 state when the PHASE signal is low. Control remains in the ET3 state if the PHASE signal is high or if the WBAC signal is high. The WBAC signal indicates that the cache controller 32 must perform or is performing a write-back operation because the snoop operations have indicated that the EISA device is requesting a memory operation to an address whose data is currently residing in the cache controller 32. In that case the cache controller 32 must perform a write-back operation so that proper data is present in the memory 42 for the EISA device to receive. Otherwise a memory coherency problem may result and erroneous data may be provided to the EISA device. Thus control of the EISA state machine 102 remains in state ET3 during EISA cycles when a write-back is occurring. It is noted that this write-back loop is not executed during EISA burst read operations because of timing constraints.

Control proceeds from the ET3 state to the ET4 state when the PHASE signal is low and a write-back is not occurring. Control similarly remains in the ET4 state if the PHASE signal is high or if a write-back cycle is occurring as indicated by the WBAC signal. This is the EISA burst read write-back loop. Control proceeds from the ET4 state to the ET5 state when the PHASE signal is low and the WBAC signal is low, indicating that a write-back is not occurring. Control remains in the ET5 state while the PHASE signal is high. Control proceeds from the ET5 state and returns to the ET3 state when the PHASE signal is low, a write operation is occurring and either an EISA burst operation is occurring as identified by the MSBURST* signal from the EISA bus E being active or a write-back cycle is occurring. This loop from the ET3 state to the ET5 state and returning is the page mode write circumstance for this particular case. Control proceeds from the ET5 state and returns to the HIDL state when the PHASE signal is low, an EISA burst is not occurring and either a write operation is occurring or the BIP signal is low. The BIP signal indicates that an EISA burst operation has started and is true until the burst operation is completed.

Control proceeds from the ET5 state to the ET6 state when the PHASE signal is low, a read operation is occurring and an EISA burst operation is occurring or when a read operation is occurring and the BIP signal is true or high. Control remains in the ET6 state while the PHASE signal is high. Control proceeds from the ET6 state to the ET3 state when the PHASE signal is low and the MSBURST signal is high. This is the page mode read cycle for EISA burst cases. Control proceeds from the ET6 state to the HIDL state when the PHASE signal is low and the MSBURST signal is also low, indicating that a burst is completed.

As noted above, control proceeds from the HIDL and ET1 states to the IT1 state when an ISA bus master is in control of the computer system C. In this portion of the EISA state machine 102 the PHASE signal is not used and so the clocking occurs on every rising edge of the CLK2 signal. Control proceeds from the IT1 state to the IT2 state in all cases. If the WBAC signal is active, indicating that a write-back is occurring, control remains in the IT2 state. Otherwise control proceeds to the IT3 state. From the IT3 state control proceeds to the IT4 state. If the WBAC signal is active, indicating that a write-back is occurring, control proceeds from the IT4 state to the IT1 state. Control would then loop at the IT2 state for the remainder of the write-back. If a write-back is not occurring, control proceeds from the IT4 state to the IT5 state. Control then proceeds from the IT5 state to the IT6 state. Control remains at the IT6 state while the SISACMD signal is high, indicating the ISA bus master is still in control of operations. Control proceeds from the IT6 state when the SISACMD signal is low, indicating that the ISA bus master has relinquished control. Control proceeds then to the HIDL state.

As indicated above, the state machines 100 and 102 are used to develop certain output signals. Often this is done in combination with external circuitry. The state machines 100 and 102 and many of the decoded signals are developed using programmable array logic (PAL) devices. In the various PAL equations the "•" symbol is the logic "AND" operation and the "+" symbol is the logic "OR" operation. If any one of the terms on the right side of the ":=" symbol in the equation is true, then the output is true. The ":=" symbol indicates registered or clocked operation and the "=" indicates asynchronous or simple combinatorial operation. The operation and connection of these devices and certain miscellaneous logic is shown in FIGS. 6, 7A, 7B, 8A, 8B, 9A, 9B, 10 and 11. For example, referring now to FIG. 6, a PAL 200 is used to develop the various bits which encode to form the states of the C5 state machine 100. These bits are referred to as the PGMCC<3..0> signals and form a bus utilized by the other PAL devices. Additionally, the PAL 200 develops the CRAS* signal and the HMNA* signal. The CRAS* signal is active low during all of the RAS and CAS states and the WIDL and WNC1 states of the C5 state machine 100. The HMNA signal, which is the next address signal used with pipelining, is developed by the following equation:

HMNA
:=RST*•RAS2•MADS*•HW_R•HL-
DA*+RST*•RAS4•MADS*•HMNA*•H-
W_R*•HLDA*

The RST signal, when active, indicates that the computer system C is being reset. Therefore the HMNA signal is active during the RAS3 state on write cycles where an MADS strobe is not present and after the RAS4 state for read cycles when an MADS strobe is not present.

Similarly, a PAL 202 contains the logic necessary to develop the EISA state machine 102. This PAL produces the PGMCE<3..0> signals which contain the encoded information indicating the various states of the EISA state machine 102. The PAL 202 produces three other signals of interest, the ERASA* signal, ERASB* signal and the EISA_LATCH* signal. The ERASA* and ERASB* signals are the RAS signals provided to banks A and B of the memory 42 by the EISA state machine 102. The EISA_LATCH* signal is utilized as a term in other PAL equations as an indicator of when to latch certain EISA signals. The equations for the three signals are as follows:

```
EISA_LATCH := ET3 · LW_R · WBAC*
            + IT2 · WBAC* · LW_R
            + IT3 · WBAC* · LW_R
ERASA := ET1 · START · REFRESH* · PHASE* ·
         LOCMEM
       + ET2 · PHASE*
       + ET3 · PHASE*
       + ET4 · PHASE*
       + ET5 · MSBURST · LW_R · PHASE*
       + ET6 · MSBURST · LW_R* · PHASE*
       + ET5 · MSBURST · LW_R* · PHASE*
       + ET5 · BIP · LW_R* · PHASE*
       + SISACMD · LOCMEM
       + ERASA · PHASE · SISACMD* · HLDA · RST*
       + WBAC
ERASB := ET1 · START · REFRESH* · PHASE* ·
         LOCMEM
       + ET2 · REFRESH* · PHASE*
       + ET3 · PHASE*
       + ET4 · PHASE*
       + ET5 · MSBURST · LW_R · PHASE*
       + ET6 · MSBURST · LW_R* · PHASE*
       + ET3 · REFRESH · PHASE
       + ET5 · MSBURST · LW_R* · PHASE*
       + ET5 · BIP · LW_R* · PHASE*
       + SISACMD · LOCMEM
       + ERASB · PHASE · SISACMD* · HLDA · RST*
       + WBAC
```

The LW_R signal is a latched version of the HW_R signal present on the host bus H to indicate a write or read operation. Development of the LW_R signal is explained below. Thus the EISA_LATCH* signal is true (active low) during portions of states ET3 and ET4 during write cycles which are not write-back cycles. Additionally the EISA_LATCH* signal is true during states IT3 and IT4 for write operations which are not write-back cycles. The ERAS A signal is active for the state following an ET1 state where the START signal is active, a REFRESH cycle is non-occurring, and the access is to local memory. Additional points and times when the ERASA signal is true are then the ET3, ET4, ET5 and ET6 states, as well as during write-back operations and ISA bus master operations to local memory. Similar conditions are present for the ERASB signal, with an additional term that the ERASB signal is low during portions of refresh operations.

Figure 7A:
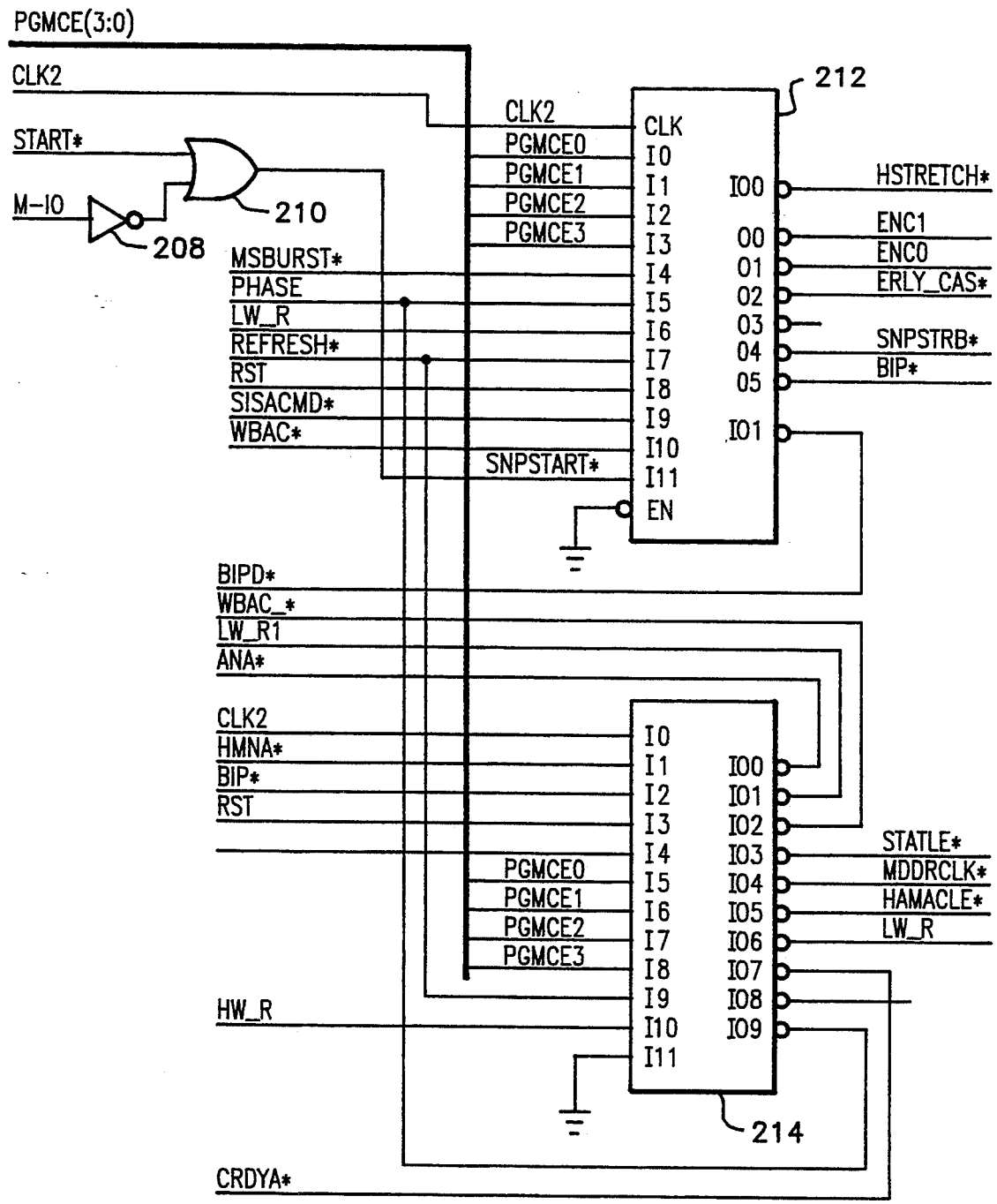

A 2 input AND gate 204 (FIG. 6) combines the CRAS* signal and the ERASA* signal to produce the MRASA* or master RAS bank A signal. Similarly, a second two input AND gate 206 combines the CRAS* and ERASB* signals to produce the MRASB* signal or master RAS bank B signal. Referring now to FIG. 7A, the MM-IO signal present on the EISA bus E is provided to an inverter 208. The output of the inverter 208 is connected to one input of a two input OR gate 210. The second input of the OR gate 210 receives the START* signal. The output of the OR gate 210 is the SNPSTART* signal, which is provided as one input to a PAL 212. Other inputs to the PAL 212 include the four EISA state machine signals PGMCE<3..0>, the CLK2 signal which is the clocking signal for the PAL 212, the MSBURST* signal, the PHASE signal, the ERLW_R signal, the REFRESH* signal, the RST signal, SISACMD* signal, the WBAC* signal and the BIPD1* signal, a one CLK2 signal cycle delayed BIP* signal. One of the outputs of the PAL 212 is the HSTRETCH* signal, which is provided to the EBC 46 to stretch the BCLK signal. The HSTRETCH signal is used to provide delays for EISA bus master cycles during read burst operations and during write-back operations. Two further signals produced by the PAL 212 are the ENC0 and ENC1 signals which as encoded values of the ET3, ET4 and ET5 states for use by other PALs. Additionally, the ERLY_CAS* signal is produced, which indicates that a CAS signal is due on the next cycle. Further, the BIP* signal is produced. A final signal produced is the SNPSTRB* or snoop strobe signal, which is provided to the cache controller 32 to indicate that this is the appropriate time in a memory cycle to snoop the address for cache coherency purposes to determine if a write-back is necessary. The ERLY_CAS* signal is used to reduce the number of terms in various later PAL equations. The equations for the PAL 214 are shown below.

```
BIP :=  ET3 · MSBURST · PHASE
      + BIP · HIDL* · RST*
SNPSTRB := ET1 · REFRESH* · PHASE* · START · RST*
         + ET6 · REFRESH* · PHASE* · MSBURST ·
           LW_R* · RST*
         + ET3 · REFRESH* · MSBURST · PHASE ·
           LW_R · WBAC* · HSTRETCHA* · RST*
         + HIDL · SISACMD · RST*
         + ET1 · SISACMD · RST*
HSTRETCHA := ET4 · BIP · LW_R* · PHASE*
           + ET3 · BIP · BIPD* · LW_R* · PHASE*
           + HSTRETCHA · PHASE · RST*
           + HSTRETCHA · ET3 · RST*
           + WBAC · PHASE* · SISACMD*
HSTRETCH := ET5 · WBAC · LW_R · HSTRETCHA
ERLY_CAS:= ET1 · PHASE · REFRESH · START + ET2 ·
           PHASE · REFRESH + ET3 · PHASE ·
           REFRESH + IT3 · WBAC* · LW_R* + IT4
           +
           IT5
```

Referring to the BIP signal, it can be seen that it is produced during the ET3 cycle during burst operations and continues until the EISA state machine 102 returns to the HIDL state.

The HSTRETCH* signal is produced by the combination of two separate terms. The first term is the HSTRETCHA signal, which equation was identified above. This signal is asserted during each EISA burst read cycle to allow address set up time as well as during the write-back write portion and parts of the write-back read portions of non-ISA bus master operations. Write-back write and write-back read operations are possible because the C5 cache controller 32 does not sense read or write status while snooping, but instead writes back in all cases, whether the controlling device is writing or reading. The HSTRETCHA signal is combined in a simple non-registered fashion with a term to complete the write-back read delays. The output of this combination is the HSTRETCH* signal.

The SNPSTRB signal is utilized to indicate to the cache controller 32 that it is appropriate to snoop the host address bus HA. A SNPSTRB signal is produced for the CLK2 cycle at the beginning of an ET2 state; the beginning of ET3 states following ET6 states, which are reads; the beginning of ET3 states for writes which are not write-back operations and during the beginning of ISA bus master operations. The ERLY_CAS signal is primarily used during REFRESH operations and is also present during states IT4, IT5 and IT6 which are not write-back operations.

A PAL 214 receives the CLK2, HMNA*, BIP*, RST, HW_R signals and the encoded values of the EISA state machine 102. Further, the PAL 214 receives the WBAC* signal, the ANA* signal and the CRDYA* signal. The ANA* signal indicates a final next address signal during a cache controller 32 burst operation to the EISA bus E and the CRDYA* signal ia a ready signal to the cache controller 32 to indicate cycle completion. The PAL 214 develops the STATLE* signal, the HAMACLE* signal and the LW_R signal. The STATLE* signal is the status latch signal and is used to latch the HW_R* signal to produce the LW_R1 signal, which in turn is used by PAL 214 to develop the LW_R signal. The HAMACLE* signal is the host address to memory address column latch enable which is used to latch in the column address for use by the memory devices. The LW_R signal is a latched version of the HW_R signal which fully comprehends write-back cycles and pipelined cycles. The equations are as follows:

```
STATLE := ET3 · REFRESH* · PHASE* · RST*
        + ET4 · REFRESH* · PHASE* · RST*
        + ET5 · REFRESH* · LW_R1* · PHASE* · BIP ·
          RST*
        + ET6 · REFRESH* · LW_R1* · PHASE* · BIP* ·
          RST*
        + HMNA · RST*
        + ANA · RST*
        + ET5 · WBAC
        + STATLE · PHASE · HLDA · RST*
        + STATLE · CRDY* · HLDA* · RST*
HAMACLE := ET3 · REFRESH* · PHASE* · RST*
         + ET4 · REFRESH* · PHASE* · RST*
         + ET5 · REFRESH* · LW_R1* · PHASE* · BIP ·
           RST*
         + ET6 · REFRESH* · LW_R1* · PHASE* · BIP* ·
           RST*
         + HMNA · RST*
         + ET5 · WBAC
         + HAMACLE · PHASE · HLDA · RST*
         + HAMACLE · CRDYA* · HLDA* · RST*
LW_R* := HW_R* · HAMACLE* · WBAC* · IT6*
       + LW_R* · HAMACLE · CRDYA* · WBAC*
       + HW_R* · HAMACLE · CRDYA · WBAC*
       + LW_R1* · HAMACLE · CRDYA · WBAC
       + LW_R* · IT6
```

Therefore the STATLE signal is active during write-back ET3 states, ET4 states, ET5 states, ET6 states, ET3 write states following ET6 states, the states following the presence of the HMNA signal and the completions of these transfers after passover to the C5 state machine 100.

The HAMACLE signal is active at the same time as the STATLE signal except it is not active following the presence of the ANA signal.

The LW_R* signal is a special latched version of the HW_R signal which comprehends write-backs and certain other pipelined transitional cases so that it is valid during the completion of the current cycle.

Figure 7B:
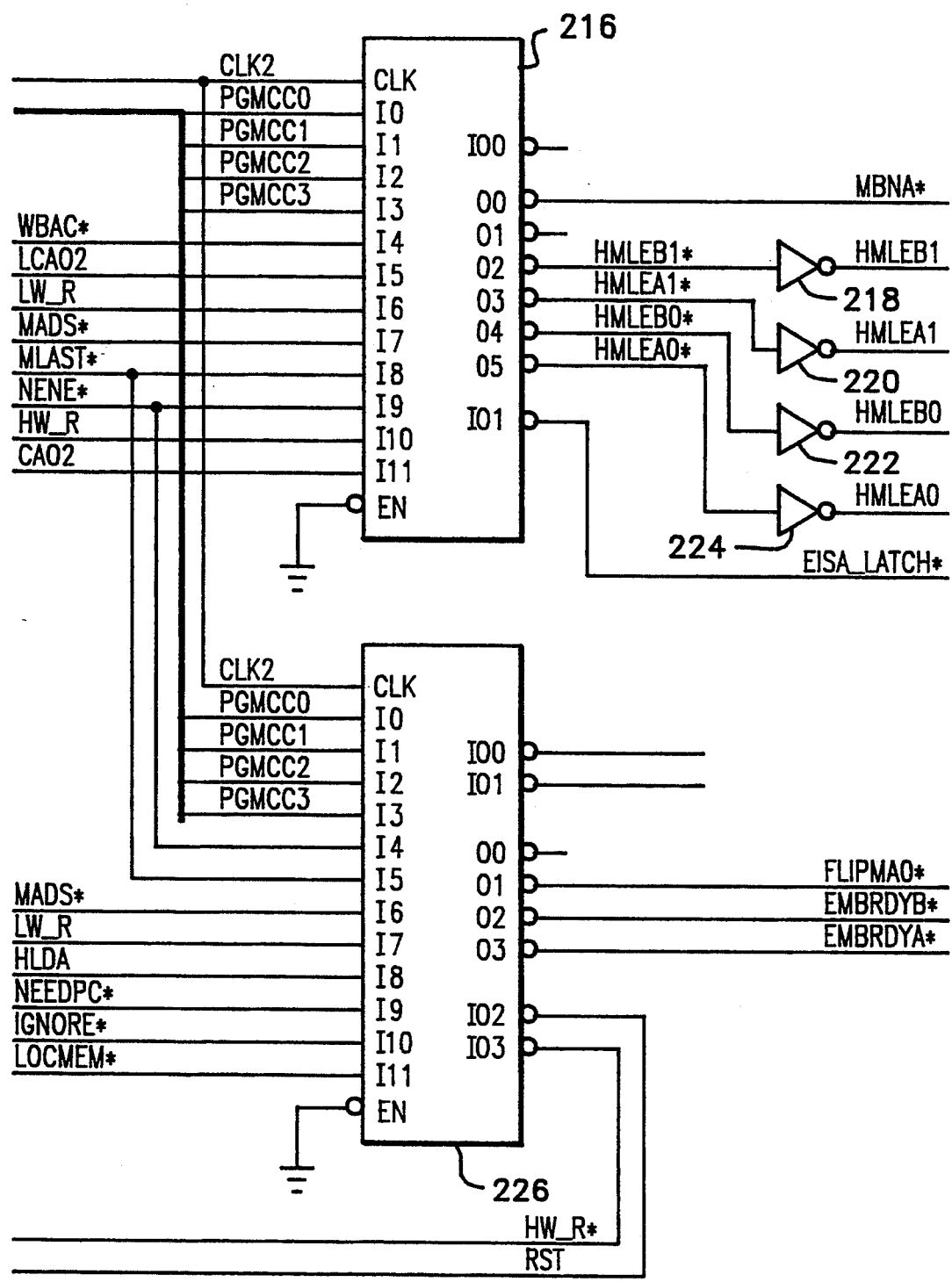

Referring now to FIG. 7B, a PAL 216 receives the CLK2 signal; the signals indicating the particular state of the C5 state machine 100; the WBAC* signal; the LCA02 signal, which is a latched version of the cache address bit 2 signal, which development will be shown below; the LW_R signal; the MADS* signal; the MLAST* signal, which is an indication that this is the last cycle of a burst operation; the NENE* signal; the HW_R* signal; the CA02 or cache address bit 2 signal as provided by the cache controller 32; and the EISA_LATCH* signal. The PAL 216 produces the MBNA* signal, and the HMLEB1*, HMLEA1*, HMLEB0* and HMLEA0* signals. The HMLE signals are the host to memory latch enable signals utilized with the latches 114, 116, 124 and 126. It is noted that these signals are inverted by inverters 218, 220, 222 and 224 and are then provided to the respective latches 124, 114, 126 and 116, respectively. The MBNA* signal is a next address signal provided to the ADS logic 50. The equations for the PAL 216 are as follows:

```
HMLEA1 := RIDL · MADS · ((CA02* · HW_R · WBAC*) +
             (LCA02* · WBAC))
         + WIDL · MADS · ((CA02* · HW_R · WBAC*) +
             (LCA02* · WBAC))
         + WAIT · MADS · ((CA02* · HW_R · WBAC*) +
             (LCA02* · WBAC))
         + RAS1 · MADS · ((CA02* · HW_R · WBAC*) +
             (LCA02* · WBAC))
         + CAS2 · MADS · ((CA02* · HW_R · WBAC*) +
             (LCA02* · WBAC))
         + RAS2 · ((CA02 · HW_R · WBAC*) + (LCA02 ·
             WBAC))
         + CAS2 · LW_R
         + EISA_LATCH
MHLEB1 := RIDL · MADS · ((CA02 · HW_R · WBAC*) +
             (LCA02 · WBAC))
         + WIDL · MADS · ((CA02 · HW_R · WBAC*) +
             (LCA02 · WBAC))
         + WAIT · MADS · ((CA02 · HW_R · WBAC*) +
             (LCA02 · WBAC))
         + RAS1 · MADS · ((CA02 · HW_R · WBAC*) +
             (LCA02 · WBAC))
         + CAS2 · MADS · ((CA02 · HW_R · WBAC*) +
             (LCA02 · WBAC))
         + RAS2 · ((CA02* · HW_R · WBAC*) + (LCA02* ·
             WBAC))
         + CAS2 · LW_R
         + EISA_LATCH
HMLEA0 := RIDL · MADS
         + WIDL · MADS
         + WAIT · MADS
         + RAS1 · MADS
         + CAS2 · MADS · MLAST
         + RAS2
         + RAS4 · LCA02* · LW_R
         + CAS2 · LCA02 · LW_R
         + EISA_LATCH
HMLEB0 := RIDL · MADS
         + WIDL · MADS
         + WAIT · MADS
         + RAS1 · MADS
         + CAS2   MADS · MLAST
         + RAS2
         + RAS4 · LCA02 · LW_R
         + CAS2 · LCA02* · LW_R
         + EISA_LATCH
MBNA := CAS1 · LCW_R · MLAST*
       + CAS4 · LCW_R* · MLAST*
       + CAS1 · MBNA
```

The HMLE signals are thus high during EISA and ISA cycles to allow data to flow directly through the latches 114, 116, 124 and 126. During control by the C5 state machine 100, the HMLE signals are provided to propagate the data through the latches 114, 116, 124 and 126 in a FIFO fashion as shown in the timing diagram of FIG. 12 and others. This FIFO arrangement is used to allow the burst cycles from the cache controller 32 to be performed in zero wait states, assuming pre-charge is met. This operation is more fully detailed in copending patent application Ser. No. 07/719,198, entitled "Memory System with FIFO Data Input" and filed concurrently with this application, which is hereby incorporated by reference.

A PAL 226 is used to produce ready indications to the ready logic for use with the cache controller 32 and produces a signal called FLIPMA0* which is used to invert certain address bits selection during burst cycles. The PAL 216 receives the CLK2 signal, the signals representing the C5 state machine state, the MLAST* signal, the NENE* signal, the MADS* signal, the LW_R signal, the NEEDPC* signal, the IGNORE* signal, the LOCMEM* signal, the HW_R* signal, the RST signal and the HLDA signal. The outputs of the PAL 226 are the FLIPMA0* signal, the EMBRDYA* signal and the EMBRDYB* signal. The equations for the PAL 226 are as follows:

```
EMBRDYA := CAS1 · LW_R*
          + CAS3 · LW_R* · MLAST*
          + RAS2 · MLAST* · (HW_R + HLDA)
          + RAS4 · MLAST* · (HW_R + HLDA)
          + CAS4 · (LW_R + HLDA)
EMBRDYB := WAIT · NEEDPC* · HW_R
          + WIDL · HLDA* · MADS · NENE · HW_R ·
              LOCMEM · IGNORE*
          + RIDL · HLDA* · MADS · NEEDPC* ·
              HW_R · LOCMEM · IGNORE*
          + RAS1 · MADS · HW_R
          + RIDL · HLDA · MADS
          + CAS2 · MLAST · MADS · NENE · HW_R ·
              LOCMEM · IGNORE*
          + RAS4 · MLAST · HW_R
FLIPMA0 := CAS2 · MLAST* · FLIPMA0* · RST*
          + FLIPMA0 · RST* · CAS3 · MLAST*
          + FLIPMA0 · RST* · CAS4 · MLAST* · LW_R*
          + FLIPMA0 · RST* · CAS4 · LW_R
          + FLIPMA0 · RST* · CAS1
```

Referring to the EMBRDYA equation, the first term provides an early ready signal during normal read operations and for the first ready in a burst. The second term provides the second and fourth READY signals during read bursts, while the third term provides the second READY signal in write bursts, the fourth term provides the third READY signal in write bursts and the final term provides the fourth READY signal in write burst operations. Referencing the EMBRDYB equation, the first five terms are all potential entrances into the RAS1 state and the last two terms are utilized in single cycle write operations. These signals are provided to ready logic (not shown) which provides the actual ready signals to the cache controller 32.

Referring to the FLIPMA0 equation, this equation inverts the FLIPMA0 signal two clock cycles after the presence of the column address strobe on burst read and write cycles as indicated by the presence of the MLAST* signal. The signal is returned to its initial state at the end of the burst cycle. As mentioned above, this signal is used to help predict addresses during burst operations.

Referring now to FIG. 8A, a PAL 228 produces the NEEDPC* and MHOE* signals. The definition and purpose of a NEEDPC* signal has been previously defined. The MHOE* signal is the memory to host output enable signal and is provided to the output enable input of the multiplexor 122. The PAL 228 receives the RST, LW_R, BCLK, CMD*, MSBURST*, HLDAD1*, REFRESH*, MCASBOTH, WBACD1*, CRAS* and CLK2 signals. The HLDAD1* and WBACD1* signals are versions of the HLDA* and WBAC* signals that are delayed one CLK2 signal cycle. The MCASBOTH signal indicates generally that a CAS strobe is active and is defined below. The MCASD1 signal is a one CLK2 signal cycle delayed version of the MCASBOTH signal. The equation for the MHOE signal is as follows:

```
MHOE = MCASBOTH · MCASD1* · LW_R* · REFRESH* ·
       HLDAD1* · RST*
     + MHOE · SB1* · SB0* · RST* · HLDAD1*
     + MCASBOTH · LW_R* · REFRESH* · HLDAD1 ·
       WBACD1* · RST*
     + MHOE · BCLK* · CMD · HLDAD1 · WBACD1* ·
       RST*
     + MHOE · CMD · MSBURST* · HLDAD1 · WBACD1* ·
       RST*
```

The SB0* and SB1* signals define the S1 state of the precharge state machine. Thus the MHOE* signal is asserted or low during the active periods of read cycles and for a period shortly thereafter.

Referring now to FIG. 8B, a PAL 230 produces the WBAC* signal, which indicates that a write-back operation is necessary and is occurring; the HDOFF* signal, which is provided to the EBC 46 to cause the data buffer/latch 52 to be tri-stated during write-back cycles; and the DONE signal relating to control of the CHRDY signal with ISA bus masters. The inputs of interest to the PAL 230 are the CLK2 signal; the MHITM* signal, which is an output from the C5 cache controller 32 which indicates there has been a hit to a modified line in the cache and so a replacement or updating of the main memory 42 is necessary before the cycle can continue; the RST signal; the CRDYA* signal and the SNPSTRBD2 signal, which is a two CLK2 signal cycle delayed version of the SNPSTRB signal. The equation for the WBAC signal is as follows:

```
WBAC
  :=SNPSTRBD2•MHITM•RST*+WBAC•CR-
    DY*•RST*
```

Therefore the WBAC signal is made active by sampling the MHITM* signal two clock cycles after the snoop strobe is provided to the cache controller 32. The signal then remains active until the ready signal is provided to the cache controller 32, indicating cycle completion.

The equation for the HDOFF signal is as follows:

```
HDOFF
  :=SNPSTRBD2•MHITM•RST*+WBAC
```

Therefore the HDOFF signal becomes active at the beginning of a write-back operation and is negated at the end of a write-back cycle. This allows the EBC 46 to turn off the data buffer/latches 52 to allow the cache controller 32 to drive the host data bus HD.

The DONE signal utilizes several other signals generated by the PAL 230 such as the HDOFF*, MCASD3*, QC1 and QC0 signals. The equations are as follows:

```
DONE := SNPSTRBD2 · MHITM* · SISACMD · RST*
      + MCASD1 · SISACMD · LW_R · HDOFF* · RST*
      + MCASD3* · QC1 · QC0 · SISACMD · WBC*
      + DONE · SISACMD · RST*
      + RST
```

The MCASD3*•QC1•QC0* term indicates a period 3 CLK2 signal cycles after the final CAS in an ISA bus master read which is preempted. The HDOFF signal is similar to the WBAC signal but extended one CLK2 signal cycle. Thus the DONE signal is asserted after a snoop does not produce a modified line hit, after a write-back is complete for a write cycle or 4 CLK2 signal cycles after the CAS strobe of an ISA bus master read which was preempted, as well as during reset. This also means that the DONE signal is not asserted until the write-back operations are complete.

A PAL 232 is used to develop the output enable signals connected to the tri-state inputs of the buffers 118 and 128. The PAL 232 receives as inputs the CLK2 signal, the CRAS* signal, the LW_R signal, the HLDA signal, the WBAC* signal, the CMD* signal from the EISA bus, the LHA02 signal, the SISACMD* signal, and the LOCMEM signal. The outputs of the PAL 232 are the HMOEB* signal, which is connected to the buffers 128, and the HMOEA* signal, which is connected to the tri-state input of the buffers 118. These signals are the host to memory bus output enable signals for the particular memory bank. The PAL 232 also produces two signals referred to as RHMOEA* and RHMOEB* which are used internally by the PAL 232. The equations for the four output signals are shown below.

```
RHMOEA := CRAS · HLDA*
        + WBAC · HLDA
RHMOEB := RHMOEA
HMOEA  = RHMOEA · LW_R
        + CMD · LW_R · LHA02* · LOCMEM
        + SISACMD · LW_R · LHA02* · LOCMEM
HMOEB  = RHMOEB · LW_R
        + CMD · LW_R · HLDA · LHA02 · LOCMEM
        + SISACMD · LW_R · LHA02 · LOCMEM
```

The RHMOEA signal is thus active one cycle delayed from the CRAS signal provided during operations of the C5 state machine 100 and during write-back cycles. The RHMOEB signal is thus a one CLK2 signal cycle delayed version of the RHMOEA signal. This is to allow the two phases or banks to have slightly different timing to reduce power supply and noise problems. The HMOEA signal and the HMOEB signal are asynchronous signals. The HMOEA signal is present during processor write operations when qualified with the RHMOEA signal, during the command portion of EISA memory cycles to the local memory where the second least significant bit of the address is even and during ISA bus master cycles which are write operations to local memory and again the address is even. The HMOEB signal is similar to the HMOEA signal except that the processor cycles are qualified by the RHMOEB signal and the EISA and ISA signals are qualified by having the double word address be a 1 or odd.

Figure 9A:
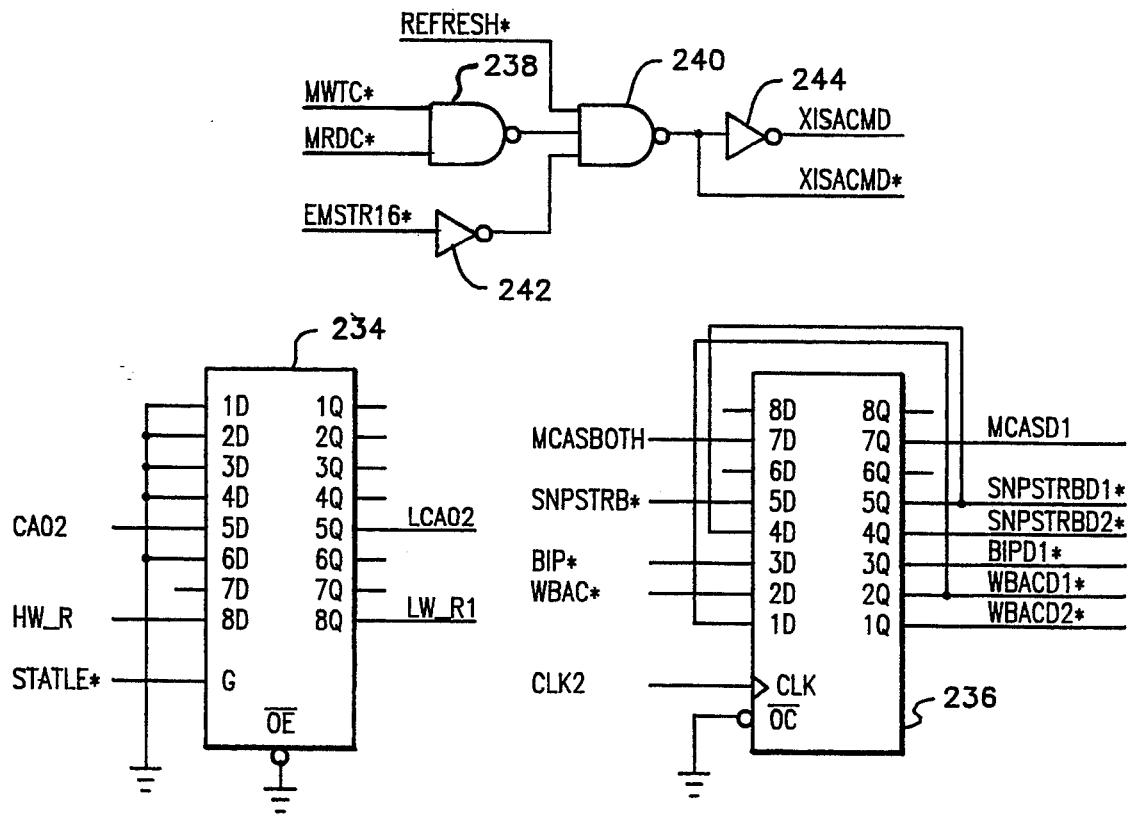

Referring now to FIG. 9A, various latches and logic circuitry used with the preferred embodiment are shown. A multi-bit latch 234 receives the STATLE* signal at its gating input. One of the D inputs of the latch 234 receives the CA02 signal from the cache controller 32, the least significant address bit for the dword values and the least significant subline bit, and thus produces the respective LCA02 output signal. The HW_R* signal is provided to a different D input to the latch 234 with a corresponding output providing the LW_R1 signal.

An 8 bit flip-flop 236 receives at its clocking input the CLK2 signal. The MCASBOTH signal is received at one D input with the corresponding Q output producing the MCASD1 signal, which is a one CLK2 signal cycle delayed version of the MCASBOTH signal. The SNPSTRB* signal is provided to another D input of the flip-flop 236. The corresponding output is the SNPSTRBD1* signal, which is provided to another D input of the flip-flop 236. The output is the SNPSTRBD2* signal, a two CLK2 signal cycle delayed version of the SNPSTRB* signal which as previously discussed is used to qualify for write-back requirements. The BIP* signal is provided to another D input of the flip-flop 236 with a corresponding output being the BIPD1* signal. The WBAC* signal is provided to a D input of the flip-flop 236. The corresponding output is the WBACD1* signal, which is provided to another D input of the flip-flop 236. The corresponding output is the WBACD2* signal.

Figure 9B:
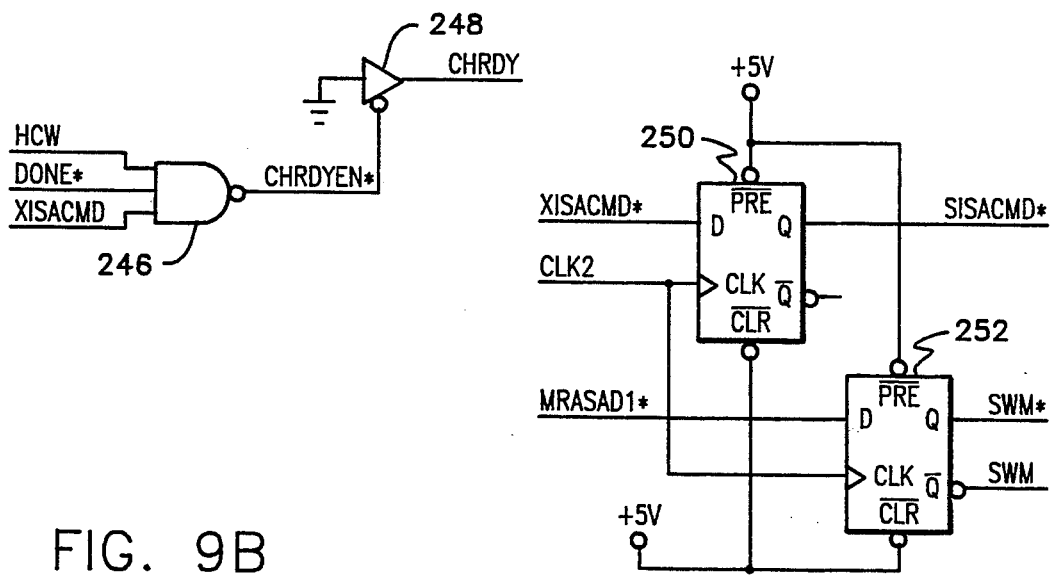

The MWTC* and MRDC* signals present on the EISA bus E to indicate ISA memory write and read operations are provided as the two inputs to a 2 input NAND gate 238. The output of the NAND gate 238 is provided as one input to a 3 input NAND gate 240. The REFRESH* signal is an additional input to the NAND gate 240, while the final input is the output of an inverter 242 whose input receives the EMSTR16* signal as provided by the ESP 48 which indicates when asserted that a 16 bit ISA bus master has control. The output of the NAND gate 240 is the XISACMD* signal which is provided to the input to an inverter 244. The output of the inverter 244 is the XISACMD signal. This signal is provided as one input to a 3 input NAND gate 246 (FIG. 9B). The HCW signal, which is provided from the DDF 36 to indicate whether this is write-back memory location, is a second input to the NAND gate 246. The final input to the NAND gate 246 is the DONE* signal, which indicates, when asserted low, that the delay needed for write-back or possible write-back operations is complete. The output of the NAND gate 246 is provided to the tri-state input of a buffer 248. The input to the buffer 248 is connected to ground, while the output is connected to the CHRDY line of the EISA bus E. This is the signal that is used to form the delay or pause in ISA bus master operations which are broken by a write-back cycle. The ISA bus master is responsive to the CHRDY line being low to delay its operations until the CHRDY line is asserted high, at which time its cycle continues. Therefore the CHRDY line is pulled low during ISA bus master operations to write-back capable locations until any write-back operations are not necessary or are completed.

The XISACMD* signal is provided to the D input of a D-type flip-flop 250. The CLK2 signal provides the clocking input to the flip-flop 250. Preferably the flip-flop 250 is a metastable resistant flip-flop. The preset and clear inputs are inverted and are preferably connected to logic high levels. The non-inverted output of the flip-flop 250 is the SISACMD* signal, which indicates that an ISA bus master operation is in progress. A flip-flop 252 receives the MRASAD1* signal at its D input and the CLK2 signal at its clock input. The preset and clear inputs are inverted and connected to logic high levels. The non-inverted output is the SWM* signal, while the inverted output is the SWM signal. This signal is used to control the output of the memory device column address latch.

Figure 10:
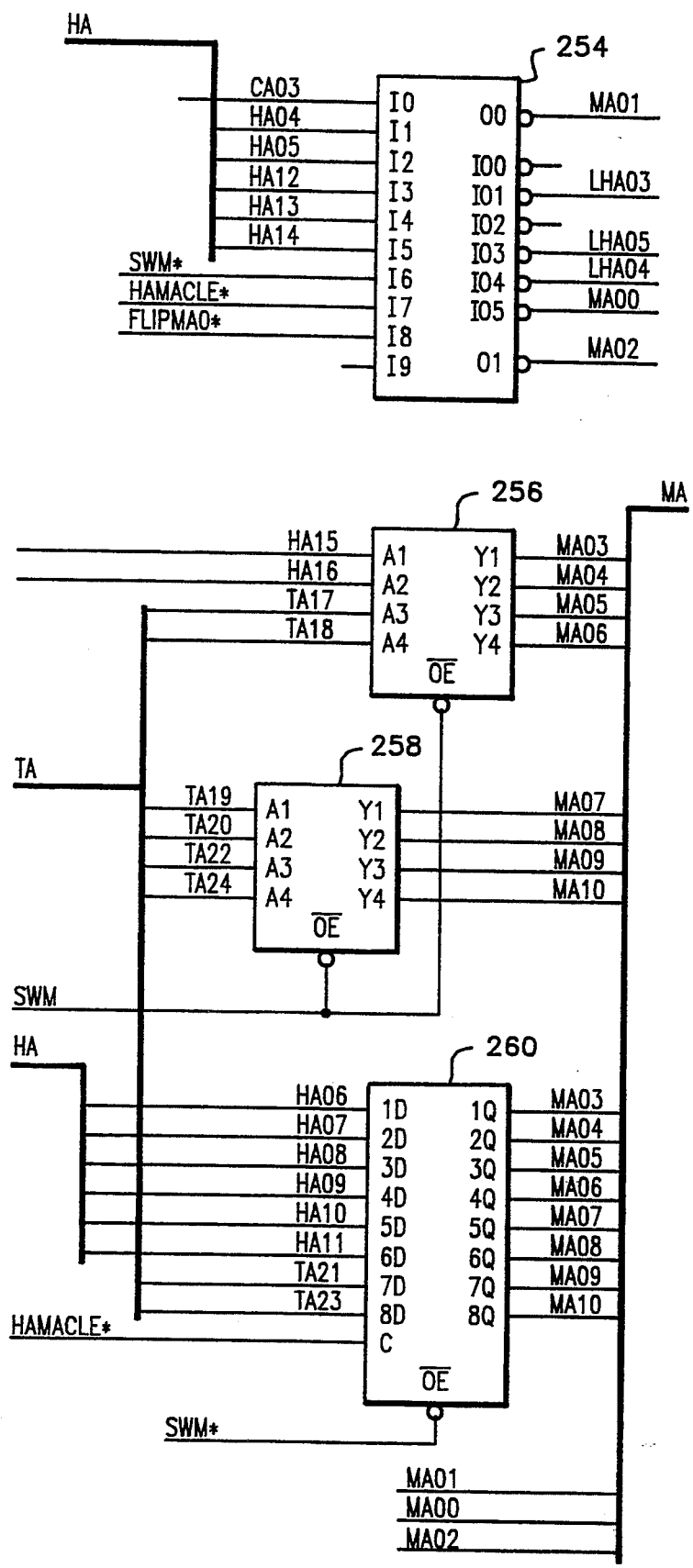

FIG. 10 illustrate the memory address multiplexor 112. A PAL 254 is used to provide the three least significant bits of the address to the DRAMs 108 and 110. The PAL 254 receives as inputs the CA03 signal, which is the next to least significant address signal provided by the cache controller 32 for cache driven cycles and the LA03 signal for EISA bus driven cycles; the HA04, 05, 12, 13 and 14 address signals from the host bus; the SWM* signal; the HAMACLE* signal and the FLIPMA0* signal. The PAL 254 produces latched versions of the CA3, HA04 and HA05 signals for use by the PAL 254 in developing the three least significant bits for the DRAMs 108 and 110. The outputs from the PAL 254 are the MA02, MA01 and MA00 bits, which form the three least significant bits of the memory address bus. The equations are as follows:

```
MA00* = SWM* · HA12*
      + SWM · LHA03* · FLIPMA0*
      + SWM · LHA03 · FLIPMA0
MA01* = SWM* · HA13*
      + SWM · LHA04*
MA02* = SWM* · HA14*
      + SWM · LHA05*
LHA03 = HA03 · HAMACLE*
      + LHA03 · HAMACLE
      + LHA03 · HA03
LHA04 = HA04 · HAMACLE*
      + LHA04 · HAMACLE
      + LHA04 · HA04
LHA05 = HA05 · HAMACLE*
      + LHA05 · HAMACLE
      + LHA05 · HA05
```

As can be seen, the LHA03, LHA04 and LHA05 signals are simply latched based on the state of the HAMACLE* signal being asserted low. Referring to the MA01 and MA02 signal equations, the first minterm is used to provide the row address, while the second minterm provides the column address. In the MA00 signal equation again the first minterm provides the row address, but the second two minterms provide the column address, the FLIPMA0 signal being utilized in burst cases as previously discussed to provide an address value change without reference to the address bus. Thus the PAL 254 forms the three least significant bits with the memory bus MA.

The remaining row address values for the memory bus MA are provided by the outputs of two buffers 256 and 258. Both buffers 256 and 258 receive at their inverted output enable signals the SWM signal. The buffer 256 receives at its data inputs the HA15, HA16, TA17 and TA18 signal from the host address bus HA and the DDF logic which are converted, respectively, to the MA03, MA04, MA05 and MA06 signals when the buffer 256 is active. Similarly, the buffer 258 receives the TA19, TA20, TA22 and TA24 signals from the DDF logic 38 and produces the MA07, MA08, MA09 and MA10 signals. An 8 bit latch 260 provides the remaining column addresses. The HAMACLE* signal is provided to the enable input of the latch 260, while the SWM* signal is provided to the inverted output enable input. The HA06–HA11, TA21 and TA23 signals from the host address bus HA and the DDF logic 38 are provided to the D inputs of the latch 260 and produce, respectively, the MA03-MA10 signals.

Figure 11:
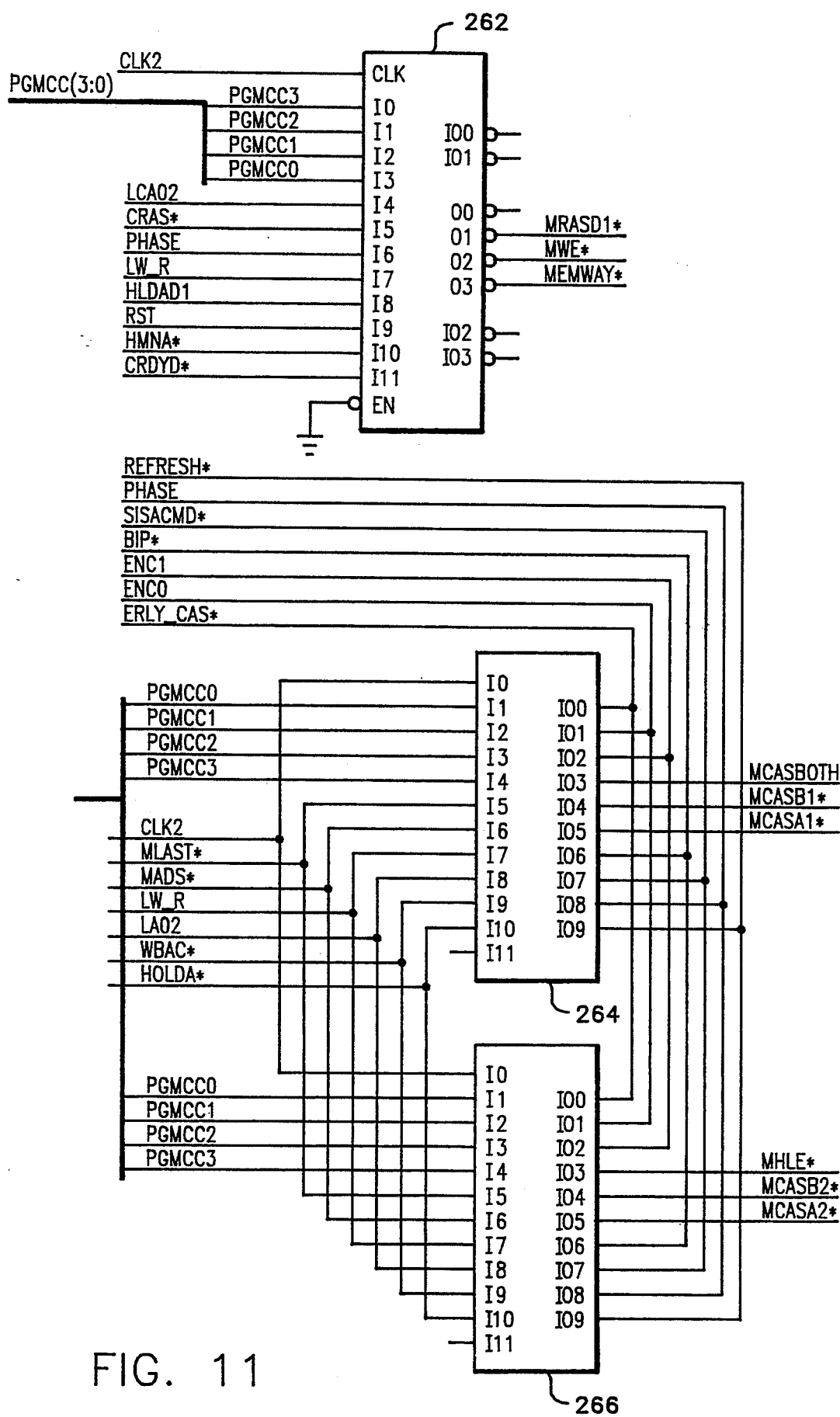

Referring now to FIG. 11, a PAL 262 which selects the appropriate bank of memory, provides the MWE* signal for the write enables to the DRAMs 108 and 110 and develops the MRASD1* signal is shown. The PAL 262 receives the CLK2 signal for a clocking signal; the four signals representing the C5 state machine 100 state; the LCA02 signal; the CRAS* signal; the PHASE signal; the LW_R signal; the HLDAD1 signal, which is the HLDA signal delayed by one CLK2 signal cycle; the RST signal; the HMNA* signal; the CRDYD* signal, which is the CRDY* signal delayed by one CLK2 signal cycle; and the ERASA* signal. The equations utilized to develop the three signals are shown below.

```
MEMWAY := CAS1 · LW_R* · LHA02*
        + RAS4 · LW_R* · HA02*
        + CAS4 · LW_R* · LHA02*
        + CAS2 · LW_R* · LHA02
        + CAS2 · LW_R* · LHA02
        + HHLDAD1 · LHA02* · PHASE*
        + MEMWAY · HLDAD1 · PHASE · RST*
        + MEMWAY · HLDAD1 · LHA02* · RST*
    MWE := HMNA · LW_R · HLDAD1*
        + MWE · CRDY* · RST* · HLDAD1* · RIDL*
        + LW_R · HLDAD1
MRASAD1 := CRAS + ERASA
```

As can be seen, the MRASAD1 signal is a simple clocked combination of the CRAS and ERASA signals. The MWE signal is active on write cases by the C5 state machine 100 from when the next address is available until the cycle is completing as indicated by the CRDY signal and during the write cases when the EBC 46 is in control of the host bus H. When the MEMWAY signal is in a low state, data from bank A of memory is provided to the host data bus HD, while when the MEMWAY signal is high, bank B memory data will be provided to the host data bus HD. The MEMWAY signal is provided to the select input of the multiplexor 122. The first five terms of the way equation relate to the provisions when the C5 state machine 100 is controlling the memory controller 40. These five minterms select the proper data from the latches 120 or 130 depending upon which bank is to be active. This is primarily based on the state of the HA02 or latched version of said signal. The final three minterms are utilized as a latch during EBC controlled cases to select based on the LHA02 signal.

Referring now to FIG. 11, a PAL 264 and a PAL 266 are shown. Both PALs 264 and 266 produce master CAS strobe outputs referred to as MCASA* and MCASB*. Identical signals are produced by both of the PALs 264 and 266 for drive current purposes. For purposes of this description only one particular PAL will be described. Additionally, the PAL 264 develops the MCASBOTH signal, while the PAL 266 develops the MHLE* signal, which is provided to the latches 120 and 130 for latching purposes. It is noted that the MCASA* and MCASB* signals must be combined with the BE<3..0> signals, in a properly latched format, to properly qualify the particular byte lane of memory to be utilized. The PALs 264 and 266 receive the PGMCC<3..0> signals for C5 state machine 100 state identification, the ENC0 and ENC1 signals for EISA state machine 102 state identification and the REFRESH*, PHASE, SISACMD*, BIP*, ERLY_CAS*, CLK2, MLAST*, MADS*, LW_R, LCA02, WBAC* and HOLDA* signals. The equations for the PAL 264 are shown below.

```
MCASA := RAS4 · MADS* · LW_R*
       + CAS4 · MLAST* · LW_R*
       + CAS1
       + CAS2 · LW_R*
       + RAS4 · MLAST* · LW_R · MADS*
       + CAS4 · LW_R
       + WNC1 · LCA02*
       + RAS4 · MLAST · LCA02* · LW_R · MADS*
       + ERLY_CAS · LCA02* · WBAC*
       + DEC_ET3 · LW_R* · BIP* · WBAC* ·
         PHASE* · REFRESH* · LCA02*
       + DEC_ET4 · WBAC* · PHASE* · REFRESH* ·
         LCA02*
       + DEC_ET5 · LW_R* · BIP · PHASE* ·
         REFRESH* · LCA02*
       + MCASA · PHASE · SISACMD* · HLDAD1 · RIDL
       + MCASA · SISACMD · LW_R*
       + ERLY_CAS · REFRESH
MCASB := RAS4 · MADS* · LW_R*
       + CAS4 · MLAST* · LW_R*
       + CAS1
       + CAS2 · LW_R*
       + RAS4 · MLAST* · LW_R · MADS*
       + CAS4 · LW_R
       + WNC1 · LCA02
       + RAS4 · MLAST · LCA02 · LW_R · MADS*
       + ERLY_CAS · LCA02 · WBAC*
       + DEC_ET3 · LW_R* · BIP* · WBAC* ·
         PHASE* · REFRESH* · LCA02
       + DEC_ET4 · WBAC* · PHASE* · REFRESH* ·
         LCA02
       + MCASB · PHASE · SISACMD* · HLDAD1 · RIDL
       + MCASB · SISACMD · LW_R*
       + ERLY_CAS · REFRESH
MCASBOTH := RAS4 · MADS* · LW_R*
          + CAS4 · MLAST* · LW_R*
          + CAS1
          + CAS2 · LW_R*
          + RAS4 · MLAST* · LW_R · MADS*
          + CAS4 · LW_R
          + WNC1
          + RAS4 · MLAST · LW_R · MADS*
          + ERLY_CAS · WBAC*
          + DEC_ET3 · LW_R* · BIP* · WBAC* ·
            PHASE* · REFRESH*
          + DEC_ET4 · WBAC* · PHASE* ·
            REFRESH*
          + DEC_ET5 · LW_R* · BIP · PHASE* ·
            REFRESH*
          + MCASBOTH · PHASE · SISACMD* ·
            HLDAD1 · RIDL
          + MCASBOTH · SISACMD · LW_R*
          + ERLY_CAS · REFRESH
```

The DEC_ET3, DEC_ET4 and DEC_ET5 signals are decoded from the ENC0 and ENC1 signals and indicate that the EISA state machine is in the ET3, ET4 or ET5 state, respectively. The MCASA and MCASB signals are similar except for qualification based on the LCA02 signal in certain portions of the cycle. In general, the various terms are provided to set the CAS signals low at the appropriate times as based on the timings of the memory devices in the particular cycles. An indication is shown in the attached timing diagrams of FIGS. 12-22. The MCASBOTH signal is effectively the OR of the MCASA and MCASB signals and is developed in a long form without the LCA02 qualifier.

As stated above, the PAL 266 develops the MHLE* signal, which is provided to the latches 120 and 130. The MHLE equation is shown below.

```
MHLE := CAS1 · LW_R*
      + CAS2 · LW_R*
```

```
           -continued
+ ERLY_CAS · WBAC*
+ DEC_ET3 · LW_R* · BIP* · WBAC* · PHASE* ·
  REFRESH*
+ DEC_ET4 · WBAC* · PHASE* · REFRESH*
+ DEC_ET5 · LW_R · BIP · PHASE* · REFRESH*
+ MHLE · PHASE · SISACMD* · HLDAD1 · RIDL
+ MHLE · SISACMD · LW_R*
+ ERLY_CAS · REFRESH
```

It is noted that the MHLE equation is qualified only for read cases, so that it does not inadvertently open during write operations. Therefore the MHLE signal is active during the proper time in read cycles from the memories 108 and 110. It is further noted that the MHLE equation is not qualified by the LCA02 signal or the MEMWAY signal and therefore the latching occurs for both memory banks, even if only one bank is selected.

Figure 12:
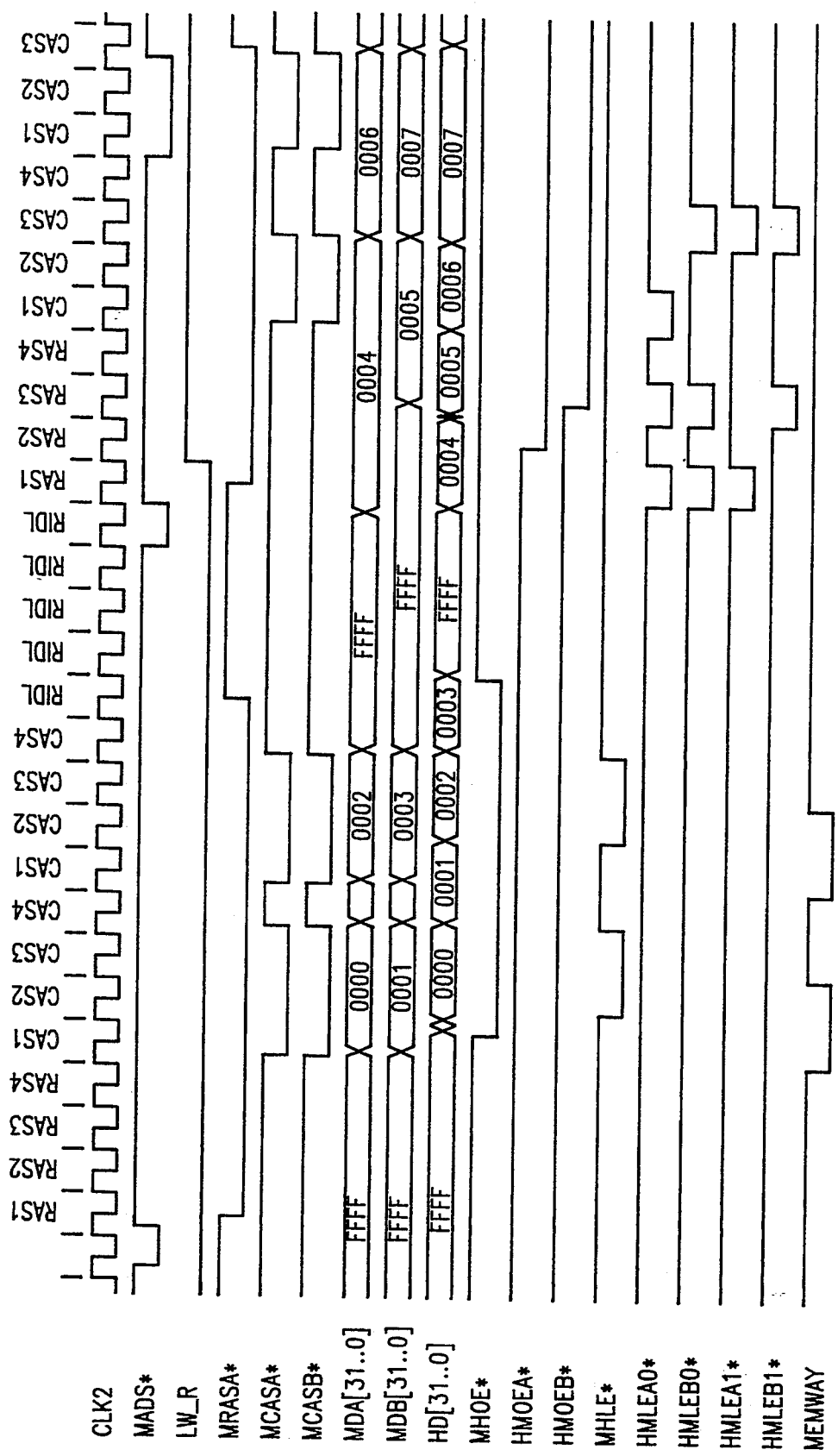
FIGS. 12, 13, 14A, 14B, 15A, 15B, 16, 17, 18, 19A, 19B, 20, 21, 22A and 22B are timing diagrams of various signals used by or developed by the memory controller of FIG. 1.
Figure 13:
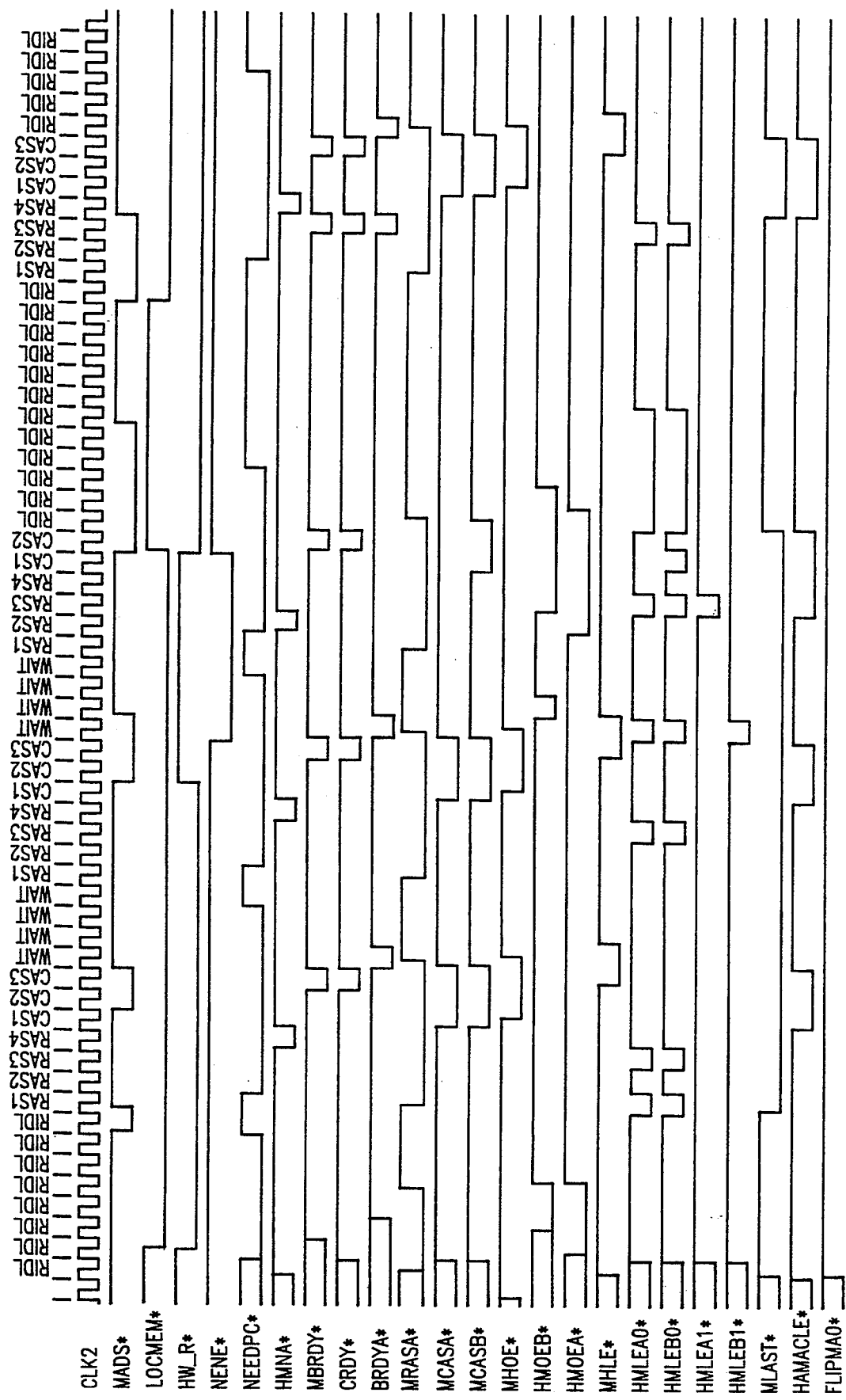
Figure 14A:
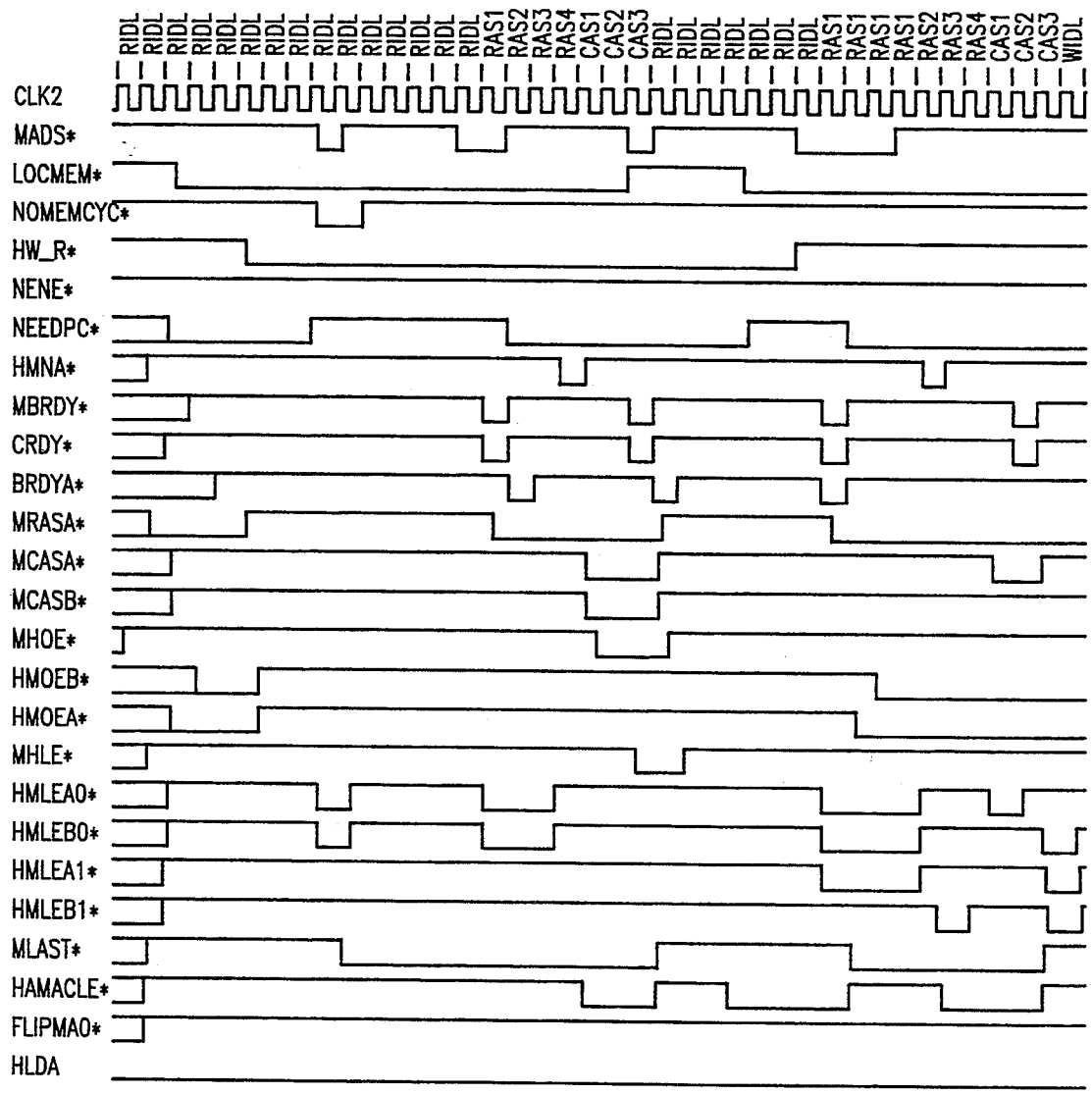
Figure 14B:
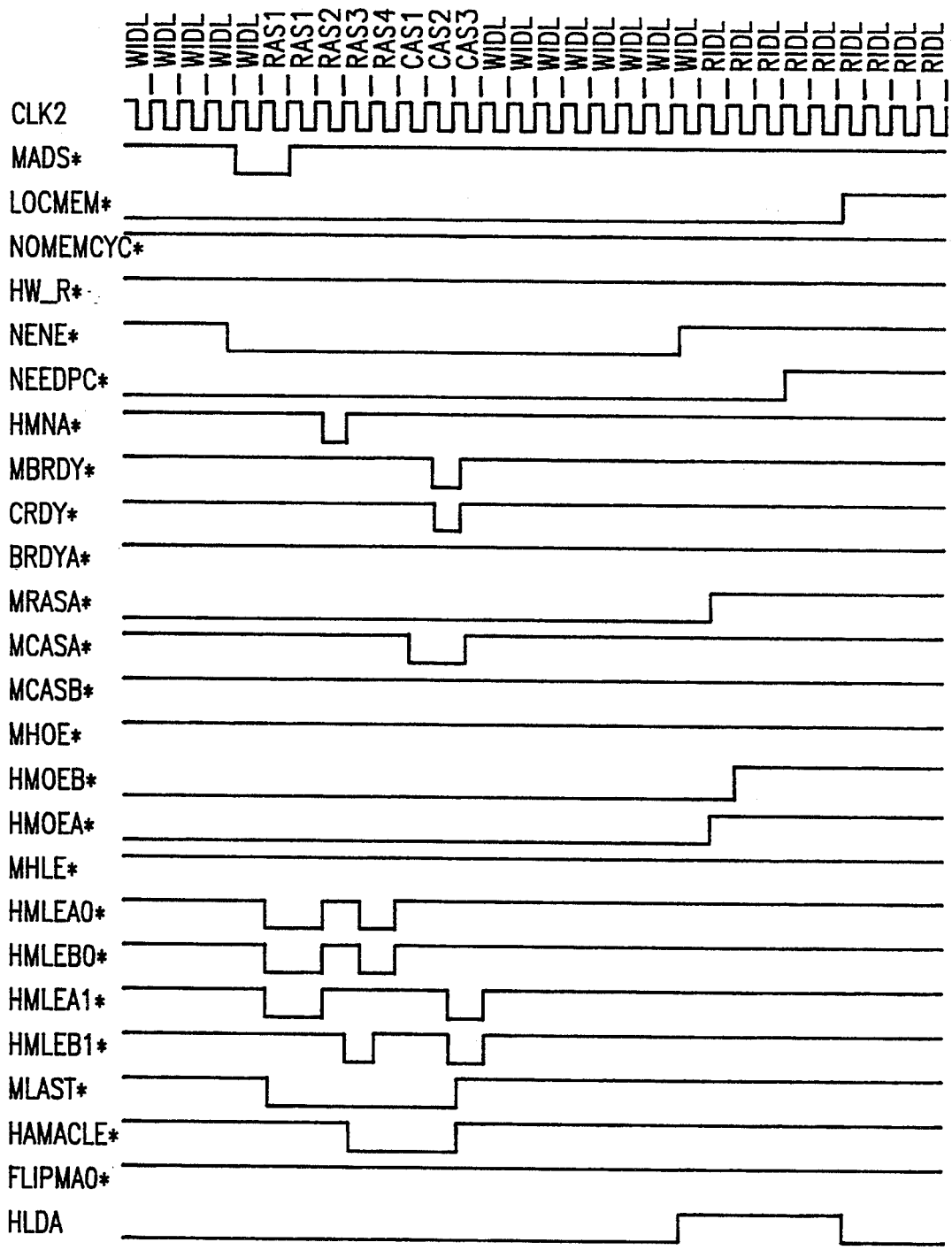
Figure 15A:
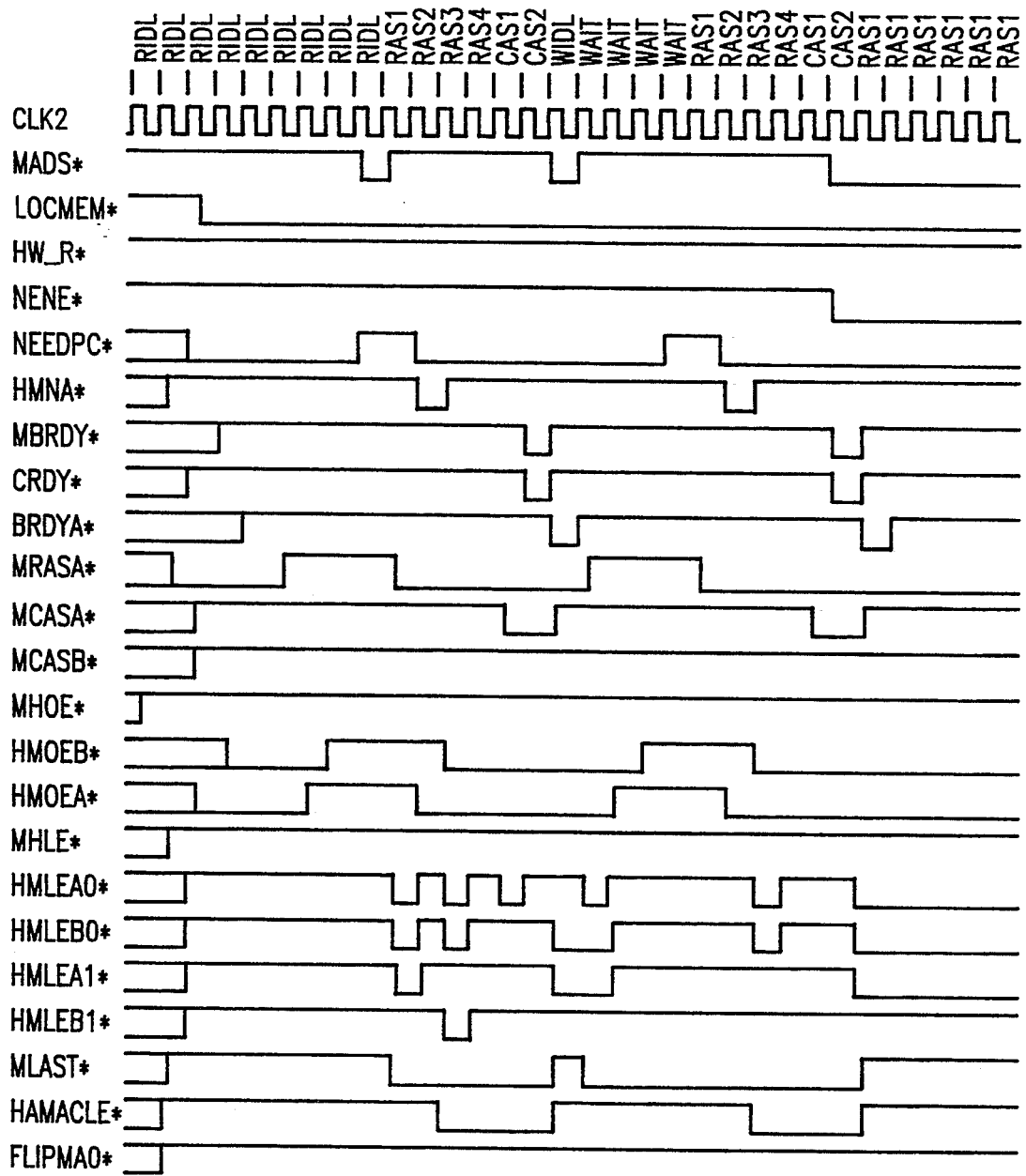
Figure 15B:
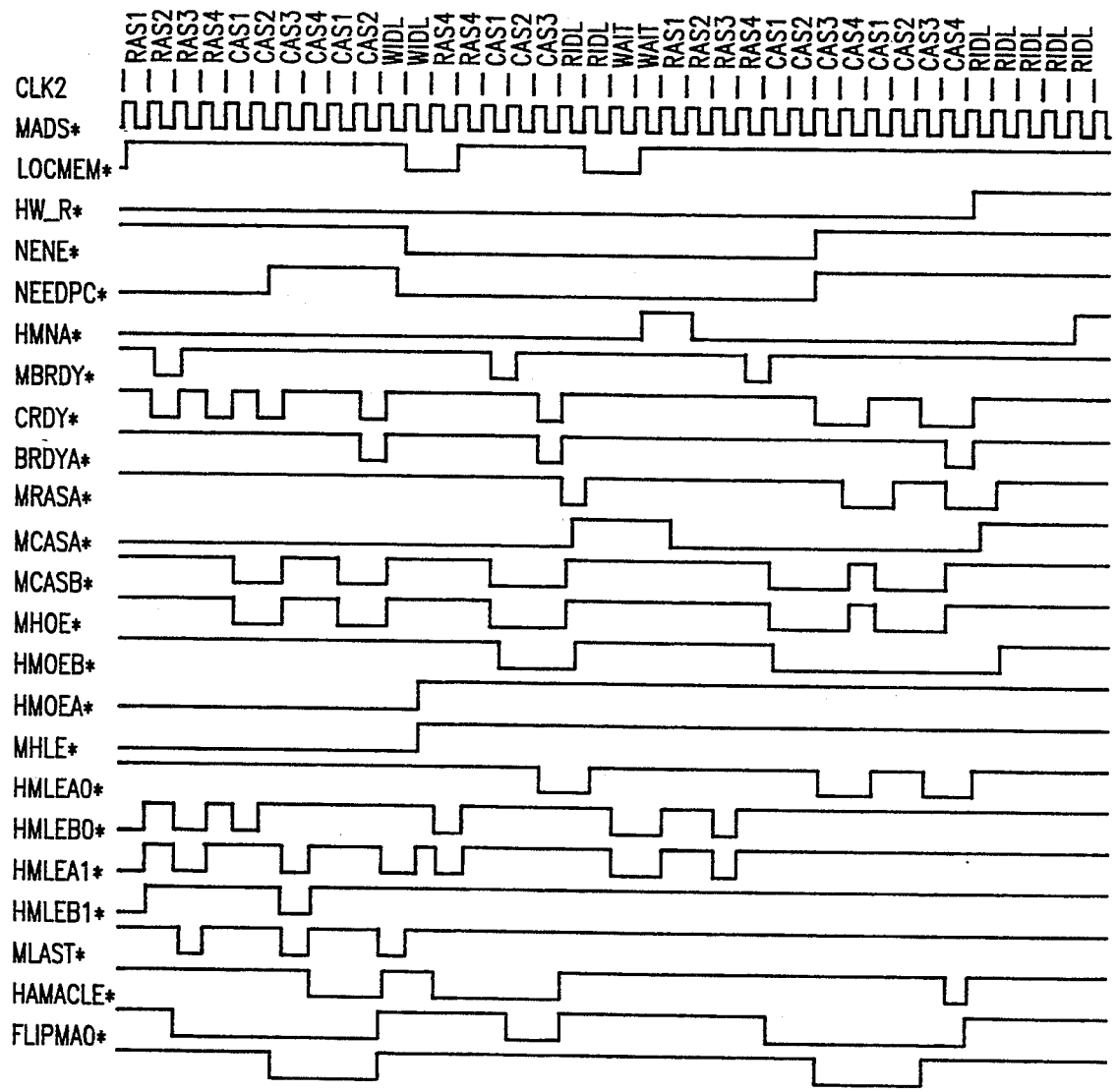
Figure 16:
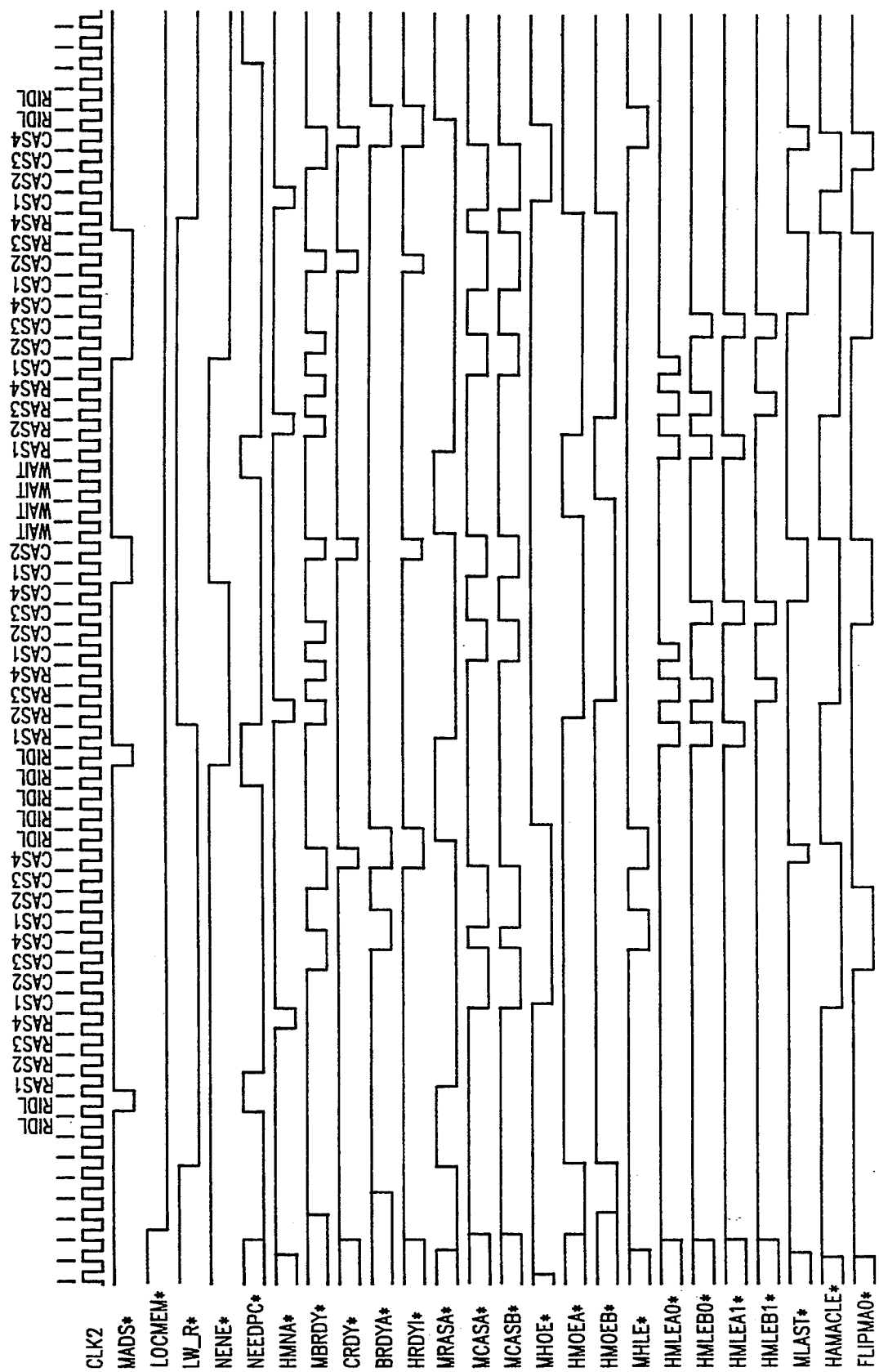

Referring now to FIGS. 12, 13, 14A, 14B, 15A, 15B, 16, 17, 18, 19A, 19B, 20, 21, 22A and 22B, timing diagrams of several instances are shown for illustrative purposes. In the event of a conflict between the indications of the timing diagrams and the equations of the state machines and PALs discussed above, the PAL equations are generally to be considered correct. FIG. 12 shows the operation of the C5 state machine 100 for a initial four dword read burst followed by an initial four dword write burst. FIG. 13 illustrates the C5 state machine 100 performing an initial single read cycle, followed by a pipelined, single read page miss cycle, followed by a pipelined, single write page miss cycle and completing with an initial single read cycle. FIGS. 14A and 14B are also controlled by the C5 state machine 100 and shows an initial single read cycle, followed by an initial single write page miss cycle, which is followed by an idle period, which is then followed by a single page hit write cycle, and then the C5 state machine is placed on hold. FIGS. 15A and 15B illustrate a C5 state machine 100 controlled sequence which is an initial single write cycle, followed by a single page miss write cycle, followed by a page hit write burst cycle of four dwords, followed by a pipelined, single page hit read cycle, which in turn is then followed by a page miss burst read cycle. FIG. 16 illustrates an initial burst read cycle, followed by an pipelined, initial burst write cycle, which is then in turn followed by a pipelined, page miss burst write cycle which is then in turn followed by a pipelined, page hit single read cycle.

Figure 17:
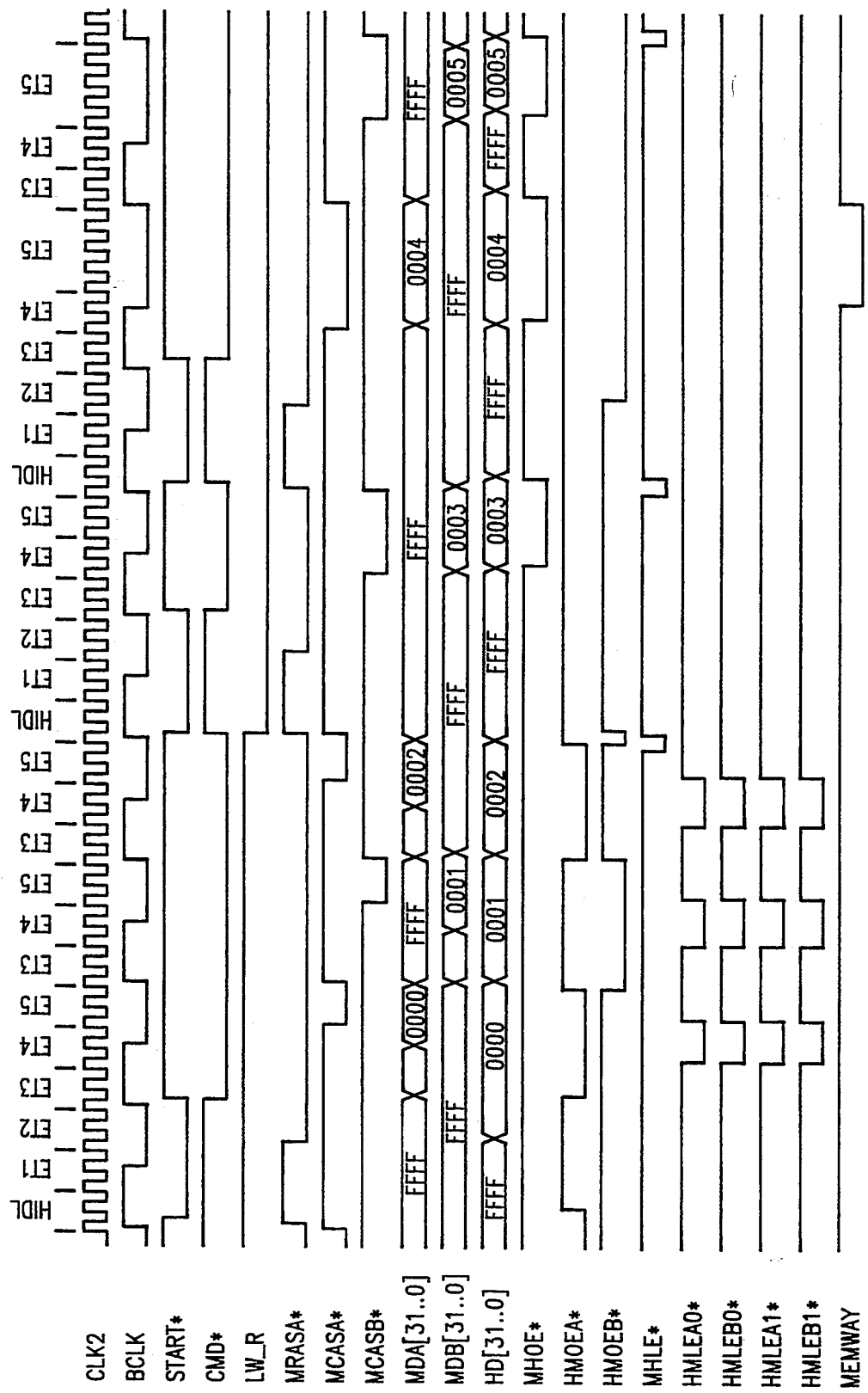

FIG. 17 illustrates operation of the EISA state machine 102 and the various signals which are developed. FIG. 17 commences with an EISA non-burst write cycle and two burst write cycles, follows with two EISA non-burst read cycles and then proceeds to an EISA burst read cycle. It is specifically noted that the BCLK signal is stretched during the EISA burst cycle, to provide sufficient timing.

Figure 18:
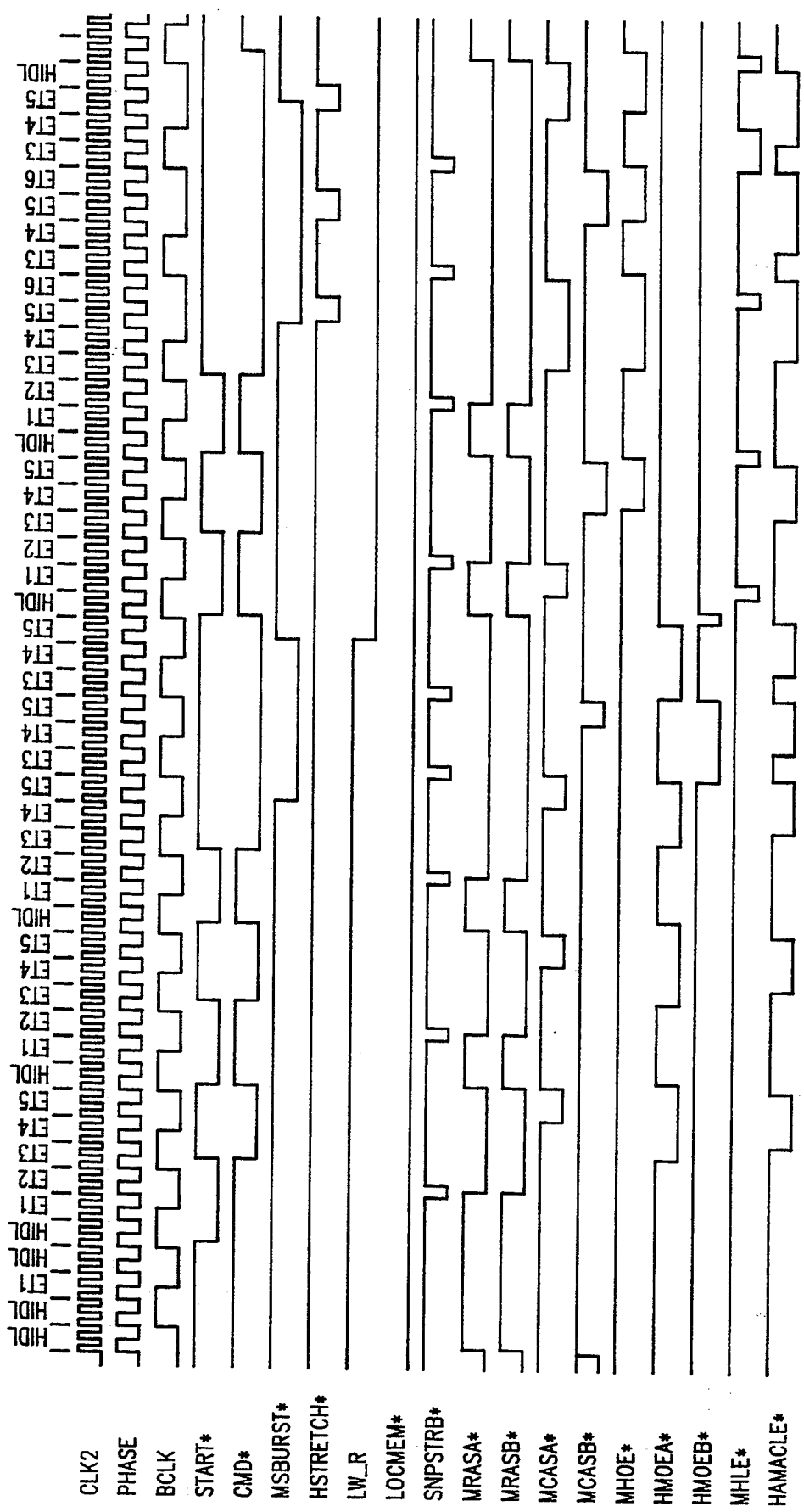

FIG. 18 commences with a series of three full EISA write cycles, followed by the two EISA burst write cycles. These are followed two single cycle EISA read operations, the second one setting up a burst, with the following then being three EISA read burst cycles. It is again noted that the HSTRETCH* signal is provided to provide additional time during the burst read operations.

Figure 19A:
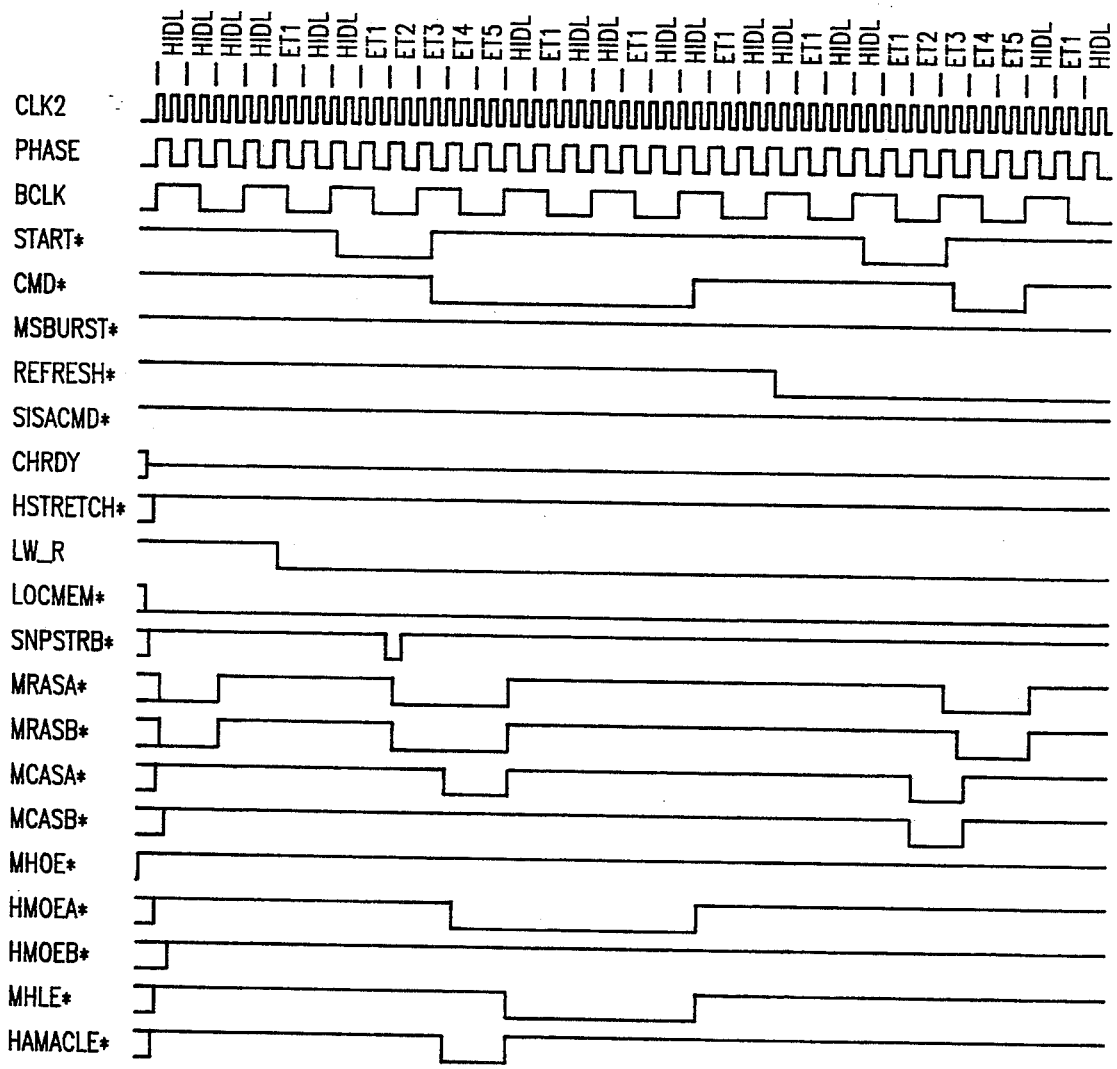
Figure 19B:
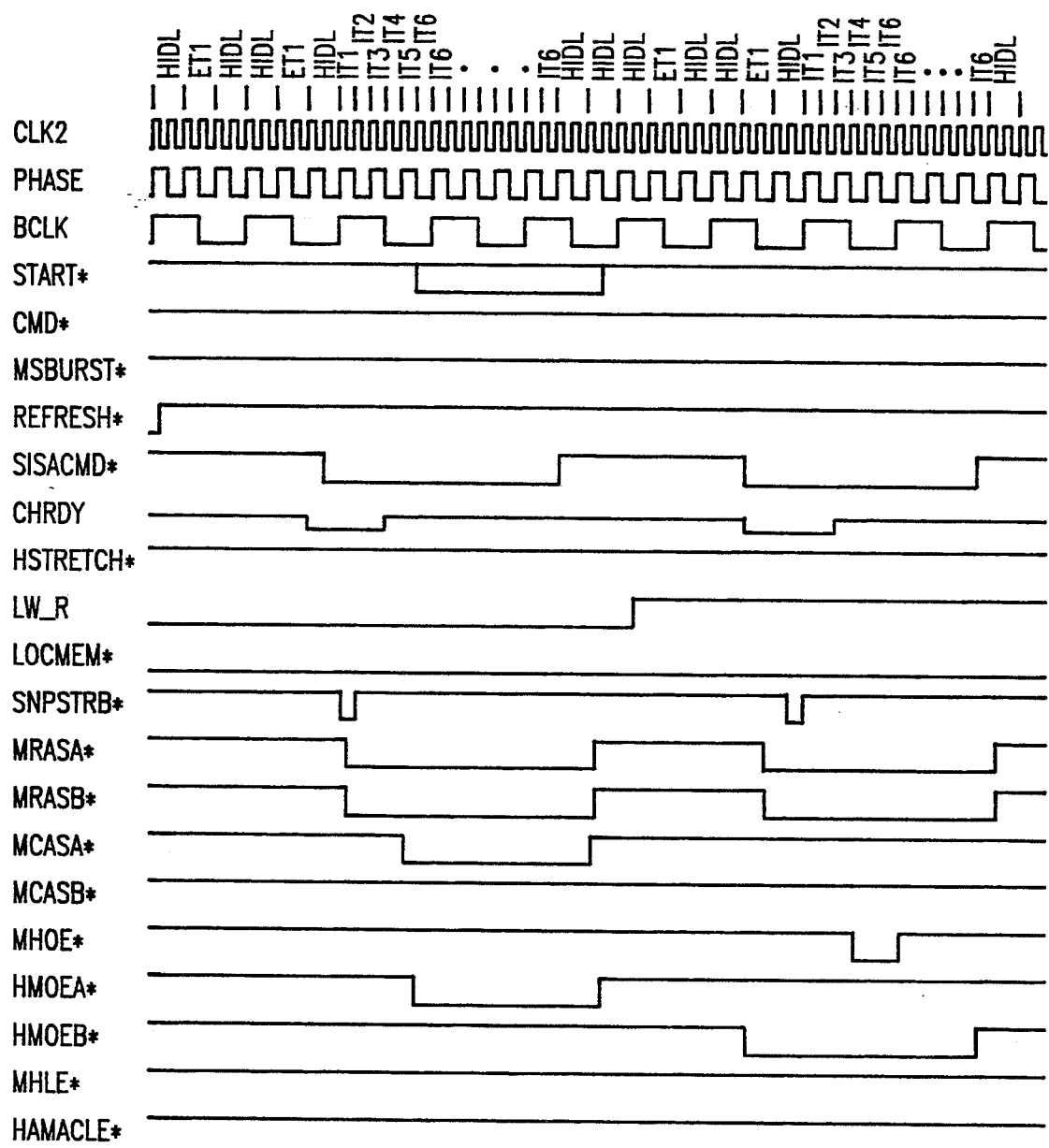

FIGS. 19A and 19B show a series of refresh cycles followed by several ISA bus master cycles. The initial ISA bus master cycle is a read, while the second ISA bus master cycle is a write. It is noted that the CHRDY signal is held low for only brief periods until it has been determined that a write-back is not necessary.

Figure 20:
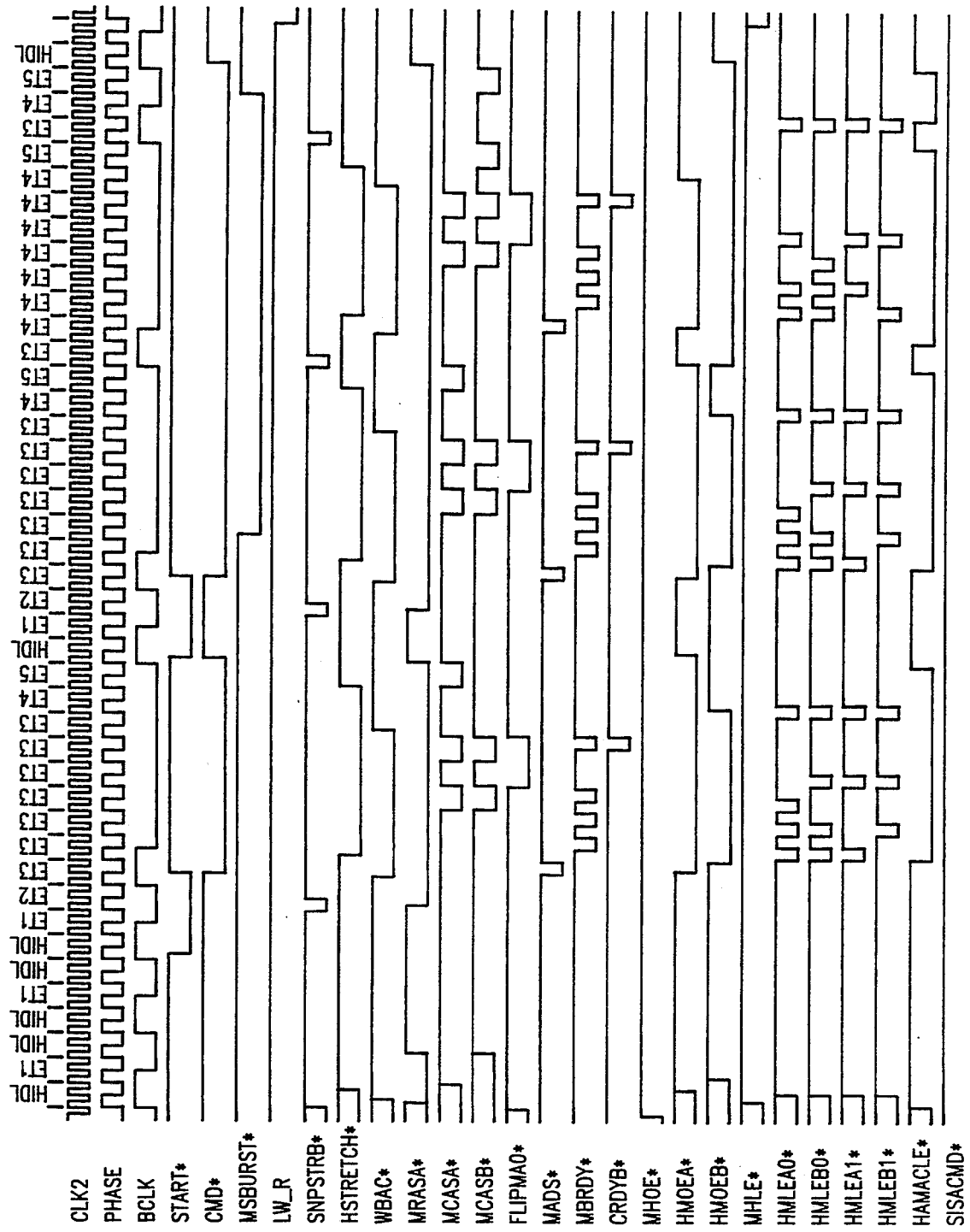
Figure 21:
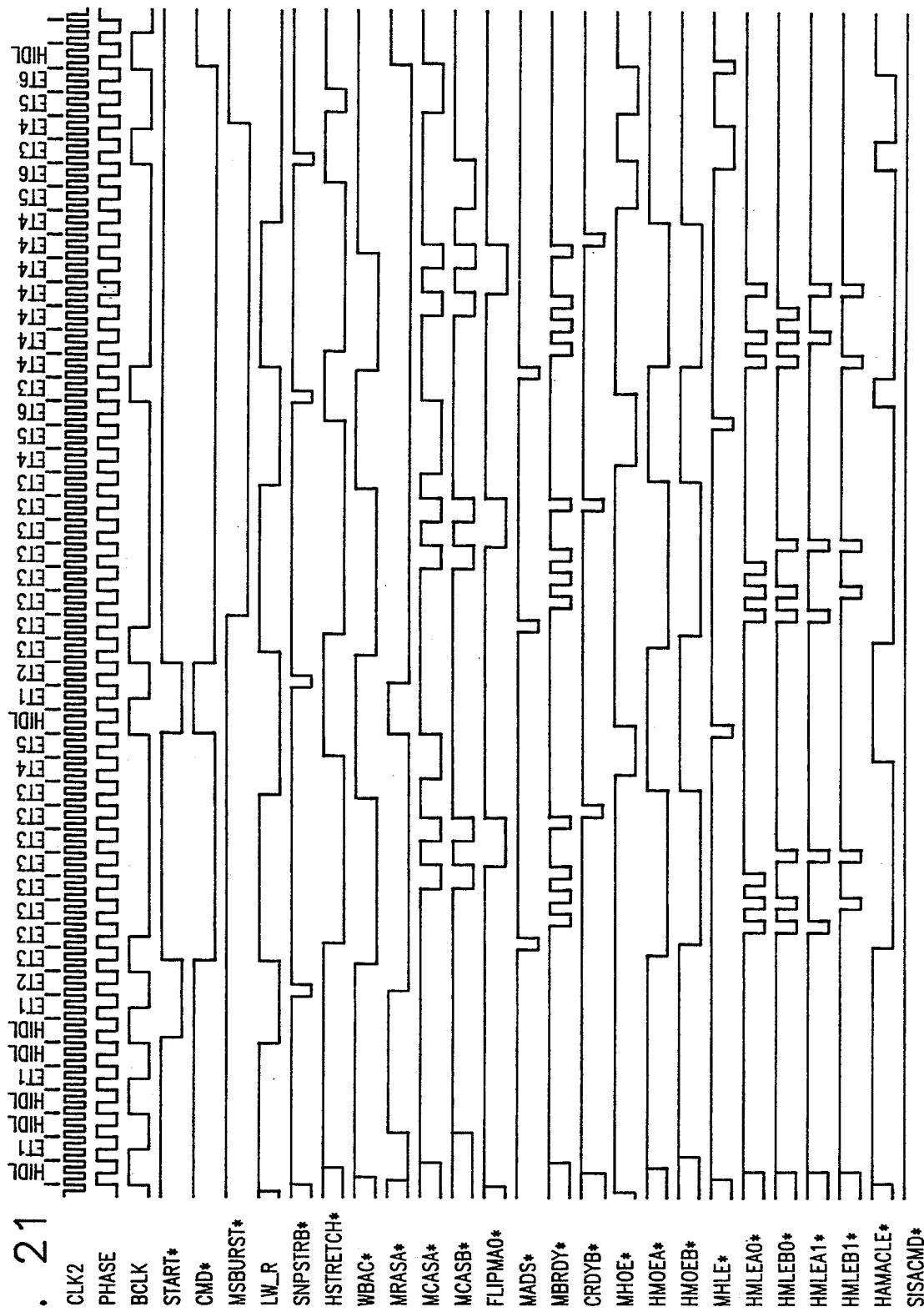

FIG. 20 illustrates the timing during a write-back example. FIG. 20 illustrates certain EISA write-back cases. The first cycle is a single EISA write cycle which is determined to require a write-back operation. The WBAC* signal is asserted to indicate the need and in response the HSTRETCH* signal goes low, which thus lengthens the BCLK signal to provide the necessary delay to allow the write-back operation as indicated to occur. The remaining cycles on FIG. 20 illustrate the write-back operation during EISA burst write cycles. It is noted that the illustrated cycle is not a conventional cycle in that three consecutive write-back cycles of four dwords occurred. If the EISA burst is sequential as is normal, then this condition would not occur. If the EISA burst is nonsequential the illustrated case may occur. It is further noted that the BCLK signal is stretched due to the operation of the HSTRETCH* signal. During the write-back operation the cache controller 32 is in control of the host bus H and the data buffer/latches 52 are not driving the host bus H, even though an EISA device started in control. Control is removed from the cache controller 32 after the write-back is complete and returned to the EISA unit. In this manner there is no bus conflict and the C5 state machine is free to utilize the host bus H when necessary. Additionally, it is noted that the write-back cycles are all run as page hit cycles, the EISA state machine 102 having set up the page address, allowing the C5 state machine 100 to proceed as if a page hit cycle has occurred. Similar cycles as those of FIG. 20 are shown in FIG. 21 except that the operations are for read cycles. It is noted, as mentioned above, that the preferred C5 cache controller provides write-backs for all cases, even during write operations.

Figure 22A:
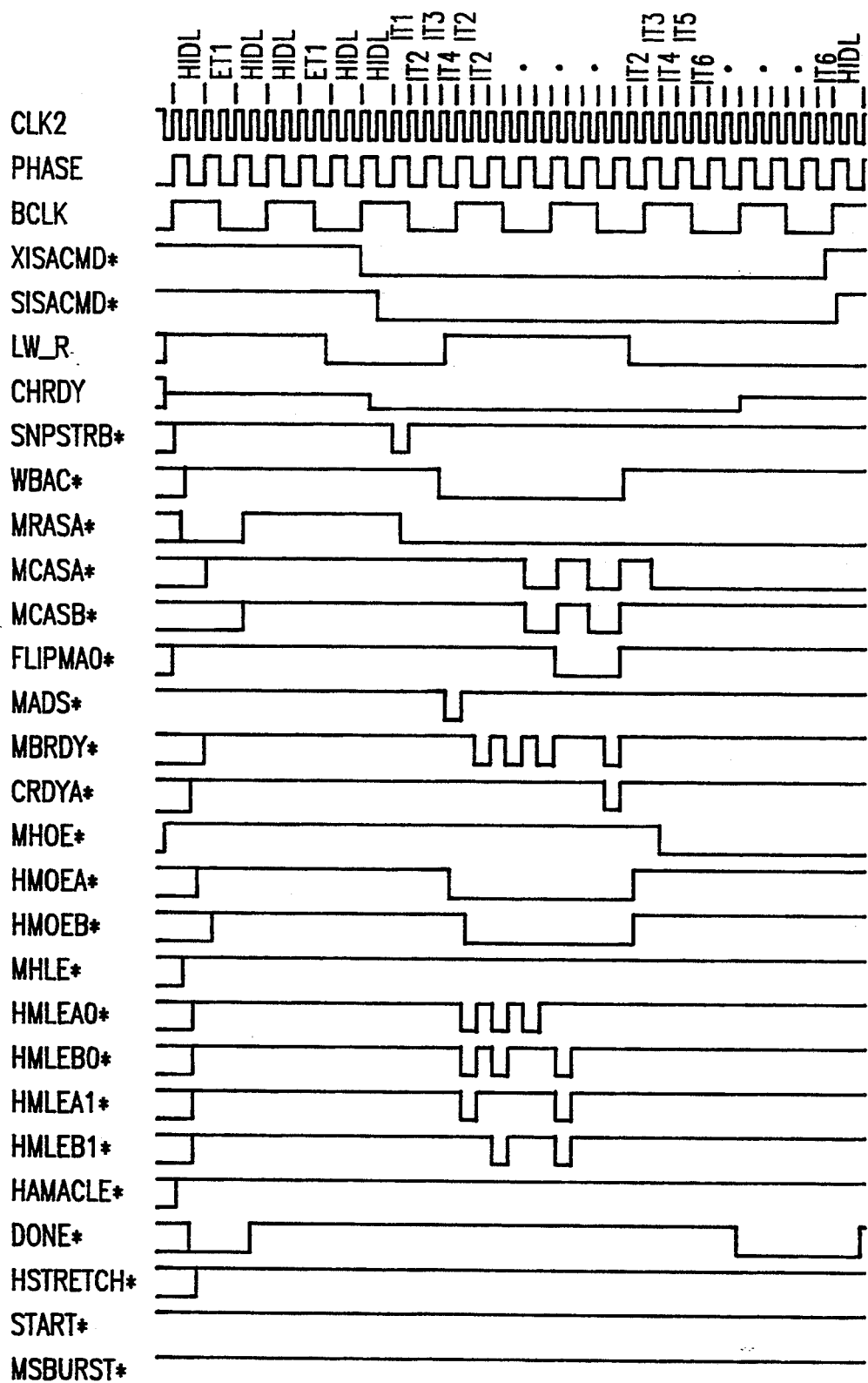
Figure 22B:
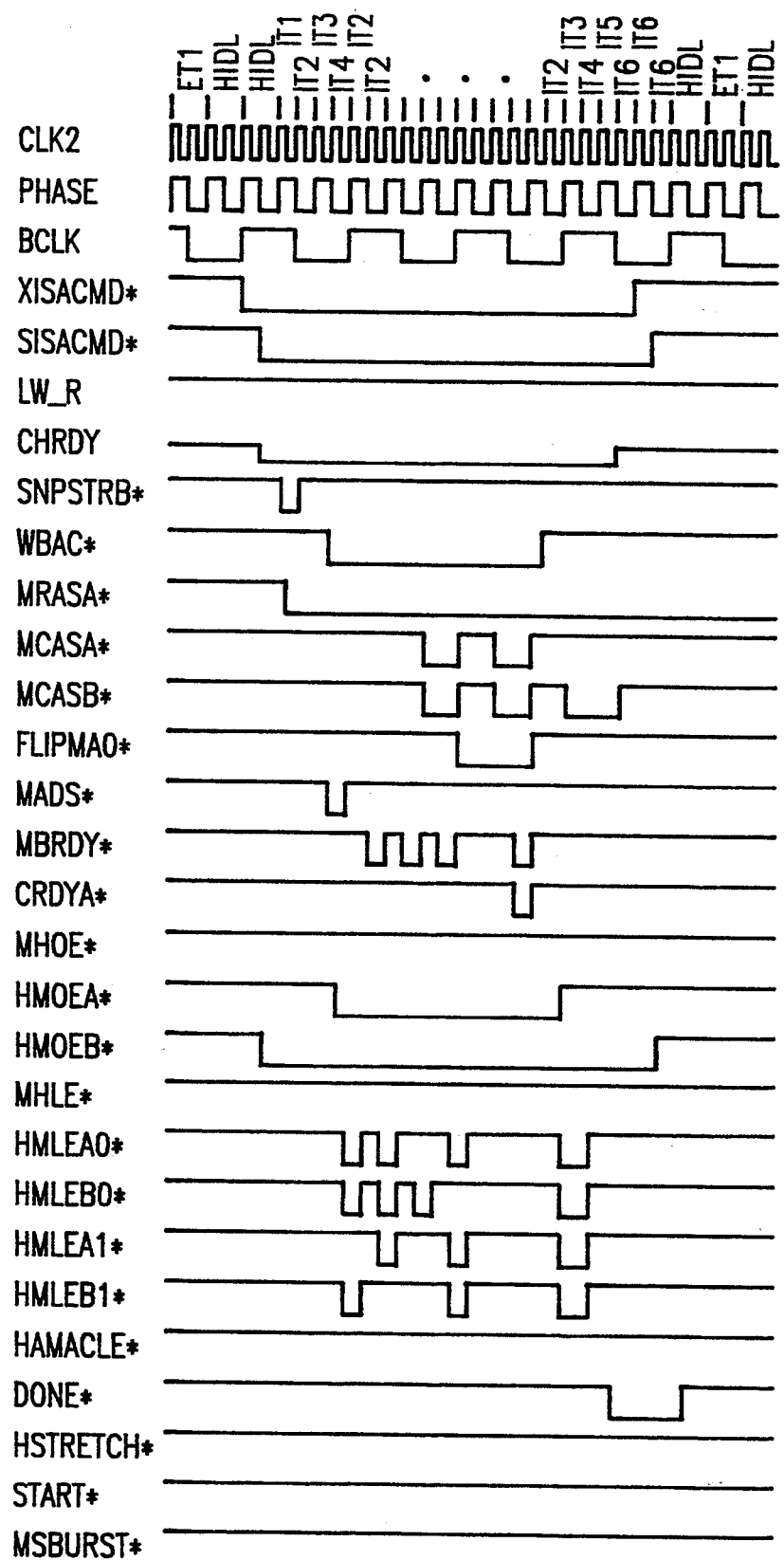

Operation of the write-back cooperation with an ISA bus master is shown in FIGS. 22A and 22B. The first operational cycle in FIGS. 22A and 22B is an ISA read cycle which is interrupted by a write-back cycle. It is noted that the ISA machine cycles at state IT2 and that the CHRDY signal is held low during and, indeed after, the write-back operation. After the write-back is completed the ISA cycle proceeds. The second main cycle shown in FIGS. 22A 22B is an ISA bus master write operation which is interrupted by a write-back cycle as noted. Again the CHRDY signal is lowered to pause the ISA bus master and allow sufficient time for the write-back operation to occur and the remaining cycle to complete.

Thus the computer system C generally operates as follows. When the cache controller 32 is controlling host bus H operations, the memory controller 40 is using the C5 state machine 100 and the associated decode logic to control memory operations. The EISA state machine 102 is generally paused. If an external bus master is granted control of the host bus H operations via the EBC 46, the memory controller 40 shifts use to the EISA state machine 102 and the associated decode logic to control memory operations. The C5 state machine is generally paused. If the cache controller 32 snoops a hit to a modified line, a write-back operation is necessary. If this is during control by an external bus master, the external bus master is paused, by stretching the BCLK signal for EISA bus masters and by asserting the CHRDY signal for ISA bus masters, and the bus master control is temporarily removed from the host bus H. The EISA state machine 102 enters a pause or hold non-idle loop while the C5 state machine 100 is activated and the cache controller 32 is given temporary control of the host bus H to perform the write-back operation. After the write-back is completed, the C5 state machine 100 returns to a paused condition, the external bus master regains control of the host bus H and the EISA state machine 102 resumes operation. Operation then proceeds as normal.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

TABLE A

| CYCLE TYPE | STATE SEQUENCE | | | | | | | |
|---|---|---|---|---|---|---|---|---|
| INITIAL SINGLE READ | | RAS1 | RAS2 | RAS3 | RAS4 | CAS1 | CAS2 | CAS3 |
| SINGLE READ PAGE HIT | | | | | RAS4 | CAS1 | CAS2 | CAS3 |
| SINGLE READ PAGE MISS | WAIT | RAS1 | RAS2 | RAS3 | RAS4 | CAS1 | CAS2 | CAS3 |
| INITIAL BURST READ | | RAS1 | RAS2 | RAS3 | RAS4 | [CAS1 | CAS2 | CAS3 CAS4] |
| INITIAL SINGLE WRITE | | RAS1 | RAS2 | RAS3 | RAS4 | CAS1 | CAS2 | |
| SINGLE WRITE PAGE HIT | | RAS1 | RAS2 | RAS3 | RAS4 | CAS1 | CAS2 | |
| SINGLE WRITE PAGE MISS | WAIT | RAS1 | RAS2 | RAS3 | RAS4 | CAS1 | CAS2 | |
| INITIAL BURST WRITE | | RAS1 | RAS2 | RAS3 | RAS4 | [CAS1 | CAS2] | CAS3 CAS4 |
| BURST WRITE PAGE HIT | | RAS1 | RAS2 | RAS3 | RAS4 | [CAS1 | CAS2] | CAS3 CAS4 |
| BURST WRITE PAGE MISS | WAIT | RAS1 | RAS2 | RAS3 | RAS4 | [CAS1 | CAS2] | CAS3 CAS4 |

[ ] INDICATES REPEATED CYCLES DURING A BURST.

TABLE B

| | | | | | | | |
|---|---|---|---|---|---|---|---|
| EISA READ/WRITE | HIDL | ET1 | ET2 | (ET3) | ET4 | ET5 | |
| EISA BURST READ | HIDL | ET1 | ET2 | [ET3 | (ET4) | ET5 | ET6] |
| EISA BURST WRITE | HIDL | ET1 | ET2 | [(ET3) | ET4 | ET5] | |
| ISA BUS MASTER | HIDL | IT1 | (IT2) | IT3 | IT4 | IT5 | {IT6} |

[ ] REPEATED DURING BURSTS
( ) REPEATED DURING WRITEBACK
{ } REPEATED DURING ISA OPERATIONS

We claim:

1. A computer system, comprising:
   a system bus including address, data and control bus portions;
   a processor;
   a write-back cache system connected to said processor and coupled to said system bus for controlling operations on said system bus, said write-back cache system including a cache controller and data memories;
   a plurality of memory devices coupled to said system bus;
   a memory controller coupled to said system bus and said memory devices for controlling operation of said memory devices;
   an external bus including address, data and control bus portions;
   an external bus interface and controller coupled to said system bus and said external bus for converting system bus operations to external bus operations and external bus operations to system bus operations;
   an external bus master coupled to said external bus for controlling operations on said external bus, some of which may be directed to said memory devices on said system bus; and
   wherein said memory controller includes means for pausing operations of said external bus master directed to said memory devices during write-back operations of said write-back cache system to said memory devices,
   wherein said memory controller includes means for controlling memory device operation when said write-back cache system is controlling said system bus and means for controlling memory device operation when said external bus master is controlling said system bus via said external bus interface and controller,
   wherein said external bus master memory device operation controlling means is paused while said write-back cache system is controlling said system bus and said write-back cache system memory device operation controlling means is paused while said external bus master is controlling said system bus, and
   wherein external bus master memory device operation controlling means is temporarily paused during a cycle and said write-back cache system device operation controlling means is temporarily activated to allow a write-back operation to occur.

2. The computer system of claim 1, wherein said memory controller is coupled to said external bus interface and controller, wherein said external bus interface and controller provides a clocking signal to said external bus and includes an input for extending a phase of said clocking signal, and wherein said memory controller further provides a signal to said clocking signal phase extending input when said external bus master memory device operation controlling means is temporarily paused to allow a write-back operation.

3. The computer system of claim 1, wherein said memory controller is coupled to said external bus, wherein said external bus includes a signal indicative of a responding device not being ready, wherein said external bus master is responsive to said not ready signal and wherein said memory controller provides said not ready signal to said external bus when said external bus master memory device operation controlling means is temporarily paused to allow a write-back operation.

* * * * *